US010005902B2

(12) United States Patent
Sybert et al.

(10) Patent No.: US 10,005,902 B2
(45) Date of Patent: *Jun. 26, 2018

(54) COMPATIBILIZED COMPOSITIONS, ARTICLES FORMED THEREFROM, AND METHODS OF MANUFACTURE THEREOF

(71) Applicant: SABIC GLOBAL TECHNOLOGIES B.V., Bergen Op Zoom (NL)

(72) Inventors: Paul Dean Sybert, Evansville, IN (US); Mark Adrianus Johannes Van Der Mee, Breda (NL); Roland Sebastian Assink, Middelburg (NL); Robert Dirk Van De Grampel, Tholen (NL); Aditya Narayanan, Evansville, IN (US); Feng Cao, Loudonville, NY (US); Kapil Chandrakant Sheth, Evansville, IL (US); Hao Zhou, Newburgh, IN (US); Xiaoyu Sun, Evansville, IN (US); Remco Wirtz, Bergen Op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 4 days.

This patent is subject to a terminal disclaimer.

(21) Appl. No.: 15/110,477

(22) PCT Filed: Jan. 12, 2015

(86) PCT No.: PCT/US2015/011042
§ 371 (c)(1),
(2) Date: Jul. 8, 2016

(87) PCT Pub. No.: WO2015/106208
PCT Pub. Date: Jul. 16, 2015

(65) Prior Publication Data
US 2016/0333181 A1 Nov. 17, 2016

Related U.S. Application Data

(60) Provisional application No. 61/926,245, filed on Jan. 10, 2014, provisional application No. 61/926,948, filed on Jan. 13, 2014, provisional application No. 61/926,953, filed on Jan. 14, 2014, provisional application No. 61/951,432, filed on Mar. 11, 2014.

(51) Int. Cl.
C08L 69/00 (2006.01)
C08L 79/08 (2006.01)
B32B 27/08 (2006.01)
C08J 5/00 (2006.01)
C25D 11/02 (2006.01)
C08K 3/22 (2006.01)

(52) U.S. Cl.
CPC .............. *C08L 69/00* (2013.01); *B32B 27/08* (2013.01); *C08J 5/00* (2013.01); *C08L 79/08* (2013.01); *C25D 11/02* (2013.01); *C08J 2369/00* (2013.01); *C08J 2469/00* (2013.01); *C08J 2479/08* (2013.01); *C08K 2003/2241* (2013.01); *C08L 2201/08* (2013.01); *C08L 2203/12* (2013.01); *C08L 2203/14* (2013.01); *C08L 2205/02* (2013.01); *C08L 2205/025* (2013.01); *C08L 2205/03* (2013.01); *C08L 2205/035* (2013.01); *C08L 2205/06* (2013.01); *C08L 2207/04* (2013.01)

(58) Field of Classification Search
None
See application file for complete search history.

(56) References Cited

U.S. PATENT DOCUMENTS

| 4,387,193 | A | * | 6/1983 | Giles, Jr. ............... C08L 69/00 525/431 |
| 4,548,997 | A | | 10/1985 | Mellinger et al. |
| 4,629,759 | A | | 12/1986 | Rock |
| 4,673,708 | A | | 6/1987 | Rock et al. |
| 4,816,527 | A | | 3/1989 | Rock |
| 5,051,483 | A | | 9/1991 | Rock et al. |
| 5,106,915 | A | | 4/1992 | Rock et al. |

(Continued)

FOREIGN PATENT DOCUMENTS

| CN | 101309973 A | 11/2008 |
| CN | 101981085 A | 2/2011 |

(Continued)

OTHER PUBLICATIONS

International Search Report for International Application No. PCT/US2015/011031, International Application Filing Date Jan. 12, 2015; dated Mar. 24, 2015; 4 pages.
International Search Report for International Application No. PCT/US2015/011042, International Application Filing Date Jan. 12, 2015; dated Mar. 24, 2015; 4 pages.
Written Opinion for International Application No. PCT/US2015/011031, International Application Filing Date Jan. 12, 2015; dated Mar. 24, 2015; 5 pages.

(Continued)

Primary Examiner — David J Buttner
(74) Attorney, Agent, or Firm — Cantor Colburn LLP

(57) ABSTRACT

A thermoplastic composition comprises, based on the total weight of the thermoplastic composition, 10 to 45 wt. % of a poly(etherimide); 35 to 90 wt. % of a poly(carbonate-siloxane); 0.5 to 20 wt. % of compatibilizer polycarbonate component comprising a poly(carbonate-arylate ester); up to 15 wt. % of an ultraviolet light stabilizer; and 0 to 30 wt. % of TiO2; wherein a sample of the composition has a notched Izod impact energy of at least 200 J/m at 23° C. measured in accordance to ASTM D256; and an at least 50% higher notched Izod impact energy value compared to the composition without the compatibilizer component measured in accordance to ASTM D256.

31 Claims, 3 Drawing Sheets

(56) References Cited

U.S. PATENT DOCUMENTS

| | | | |
|---|---|---|---|
| 5,387,639 A | 2/1995 | Sybert et al. | |
| 5,986,016 A * | 11/1999 | Puyenbroek | C08L 79/08 |
| | | | 525/420 |
| 7,321,014 B2 * | 1/2008 | Glasgow | C08G 63/64 |
| | | | 525/446 |
| 7,452,944 B2 | 11/2008 | Gallucci et al. | |
| 2013/0224462 A1 | 8/2013 | Van Der Mee et al. | |
| 2013/0261202 A1 | 10/2013 | Cao et al. | |
| 2015/0353732 A1 | 12/2015 | Wang | |
| 2016/0326366 A1 * | 11/2016 | Sybert | C08L 69/00 |

FOREIGN PATENT DOCUMENTS

| | | |
|---|---|---|
| EP | 0117327 A1 | 9/1984 |
| EP | 0186927 A2 | 12/1984 |
| WO | 9410245 | 5/1994 |

OTHER PUBLICATIONS

Written Opinion for International Application No. PCT/US2015/011042, International Application Filing Date Jan. 12, 2015; dated Mar. 24, 2015; 5 pages.

* cited by examiner

COMPATIBILIZED COMPOSITIONS, ARTICLES FORMED THEREFROM, AND METHODS OF MANUFACTURE THEREOF

CROSS REFERENCE TO RELATED APPLICATIONS

This application is a National Stage application of PCT/US15/11042, filed Jan. 12, 2015, which claims the benefit of U.S. Provisional Application No. 61/926,245, filed Jan. 10, 2014, U.S. Provisional Application No. 61/926,948, filed Jan. 13, 2014, U.S. Provisional Application No. 61/926,953, filed Jan. 14, 2014, and U.S. Provisional Application No. 61/951,432, filed Mar. 11, 2014, all of which are incorporated by reference in their entirety herein.

BACKGROUND

This disclosure is directed to compatibilized thermoplastic compositions, articles formed therefrom, and their methods of manufacture, and in particular compatibilized thermoplastic compositions with advantageous properties such as improved impact strength, stable color, or desirable chemical resistance.

Polycarbonate homopolymers, polycarbonate copolymers, and polyetherimides are useful in a wide variety of applications at least in part because of their good balance of properties, such as moldability, heat resistance and impact properties, among others. Despite extensive research on these materials over the years, there still remains a need in the art for improved thermoplastic compositions that meet increasingly stringent industry standards.

For example, polyetherimides are known as outstanding high performance materials, having a high glass transition temperature (Tg), and high modulus and strength at elevated temperatures, good dimensional stability, as well as excellent chemical resistance. However, polyetherimides have a natural amber color with a yellowness index that can be greater than 50. This limits its colorability to dark or fairly light colors, but not to very light colors such as bright white colors. Further, the loading level of white pigment needed to achieve even fairly light color results in deterioration of mechanical properties especially poor notched-impact strength at room temperatures. Again, it is challenging to develop materials that retain the properties of polyetherimides, including chemical resistance, high flow, and high impact, but that can be manufactured as white materials without comprising these desirable properties.

SUMMARY

In an embodiment, a thermoplastic composition comprises, based on the total weight of the thermoplastic composition, 10 to 45 wt. % of a poly(etherimide); 35 to 90 wt. % of a poly(carbonate-siloxane); 0.5 to 20 wt. % of compatibilizer polycarbonate component comprising a poly(carbonate-arylate ester); up to 15 wt. % of an ultraviolet light stabilizer; and 0 to 30 wt. % of $TiO_2$; wherein a sample of the composition has a notched Izod impact energy of at least 200 J/m at 23° C. measured in accordance to ASTM D256; and an at least 50% higher notched Izod impact energy value compared to the composition without the compatibilizer component measured in accordance to ASTM D256.

In another embodiment, an article selected from a molded article, a thermoformed article, an extruded sheet, an extruded fiber or filament, a printed article, a foamed article, one or more layers of a multi-layer article, a substrate for a coated article, and a substrate for a metallized article comprising the composition.

A method of manufacture of an article, comprising molding, extruding, 3-dimensional printing, or casting the composition to form the article.

The above described and other features are exemplified by the following Drawings, Detailed Description, and Examples.

BRIEF DESCRIPTION OF THE DRAWINGS

A description of the figures, which are meant to be exemplary and not limiting, is provided in which.

Figure 1:
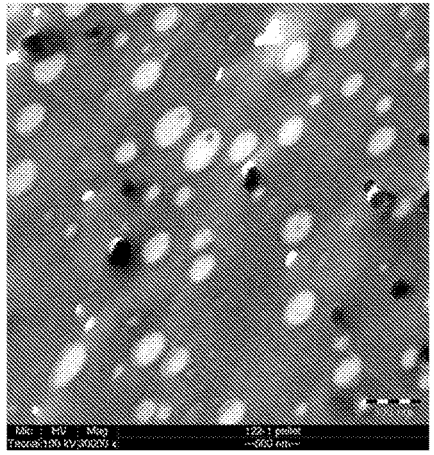
FIG. 1 shows a scanning electron microscopic ("SEM") image of the composition of example 74.
Figure 2:
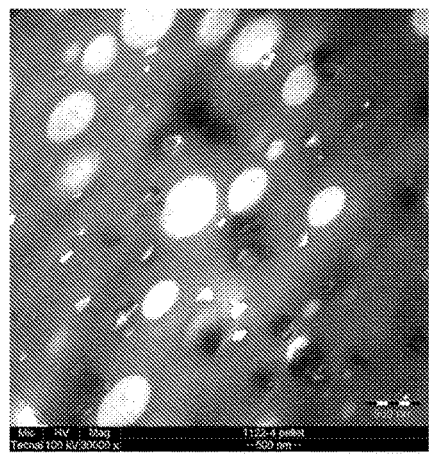
FIG. 2 shows a scanning electron microscopic ("SEM") image of the composition of example 73.
Figure 3:
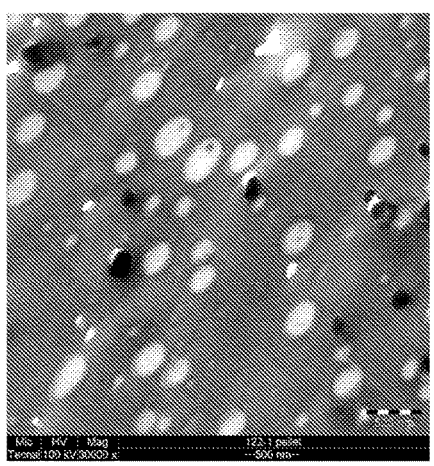
FIG. 3 shows a scanning electron microscopic ("SEM") image of the composition of example 74.
Figure 4:
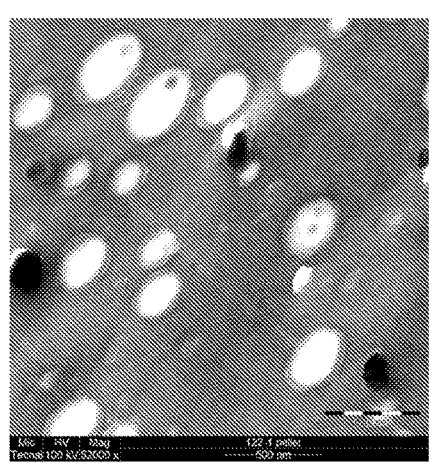
FIG. 4 shows a scanning electron microscopic ("SEM") image of the composition of example 74.
Figure 5:
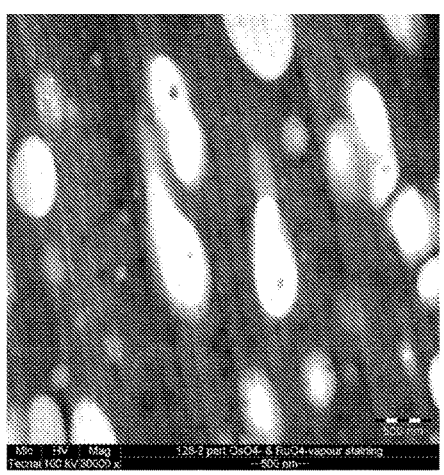
FIG. 5 shows a scanning electron microscopic ("SEM") image of the composition of example 77.
Figure 6:
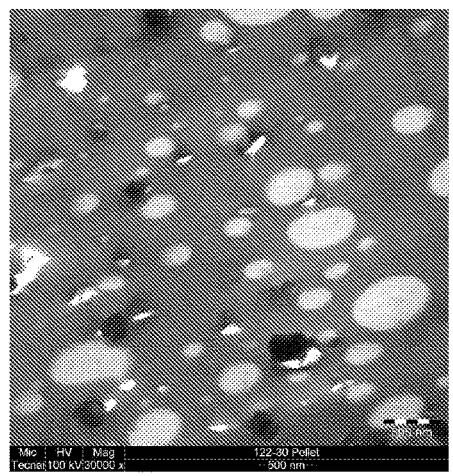
FIG. 6 shows a scanning electron microscopic ("SEM") image of the composition of example 78.
Figure 7:
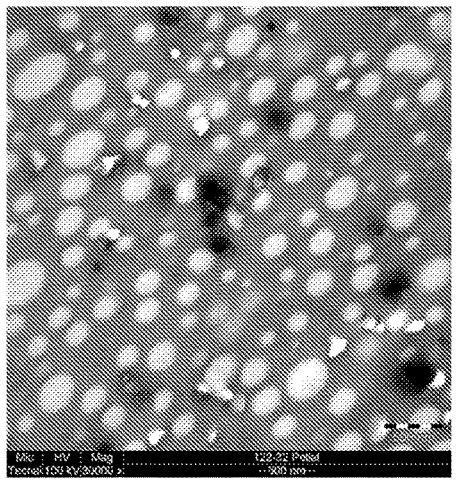
FIG. 7 shows a scanning electron microscopic ("SEM") image of the composition of example 81.
Figure 8:
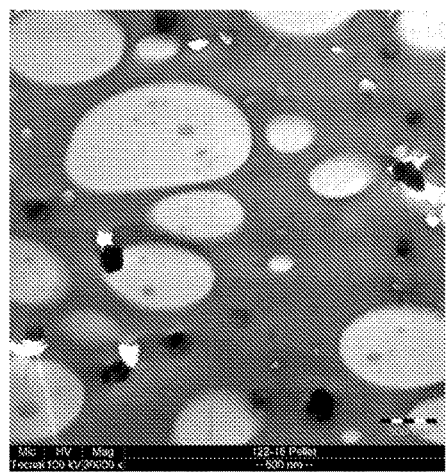
FIG. 8 shows a scanning electron microscopic ("SEM") image of the composition of example 82.
Figure 9:
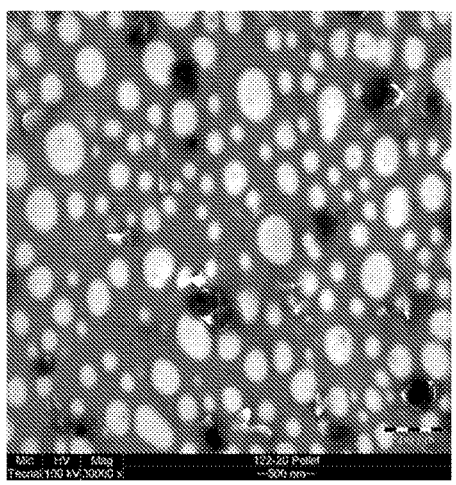
FIG. 9 shows a scanning electron microscopic ("SEM") image of the composition of example 83.
Figure 10:
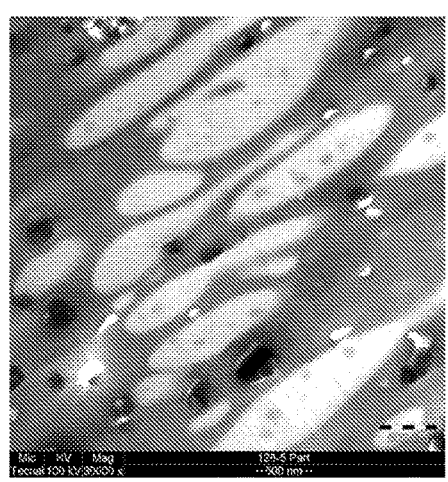
FIG. 10 shows a scanning electron microscopic ("SEM") image of the composition of example 87.
Figure 11:
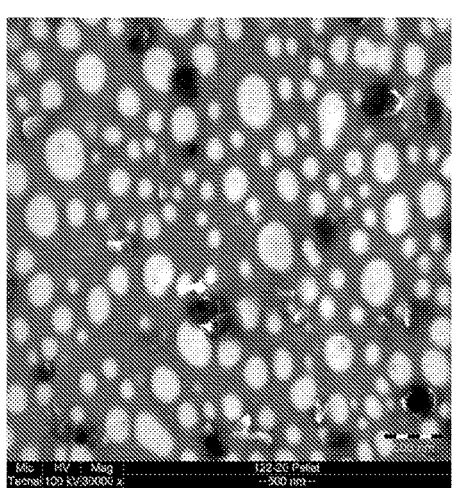
FIG. 11 shows a scanning electron microscopic ("SEM") image of the composition of example 83.
Figure 12:
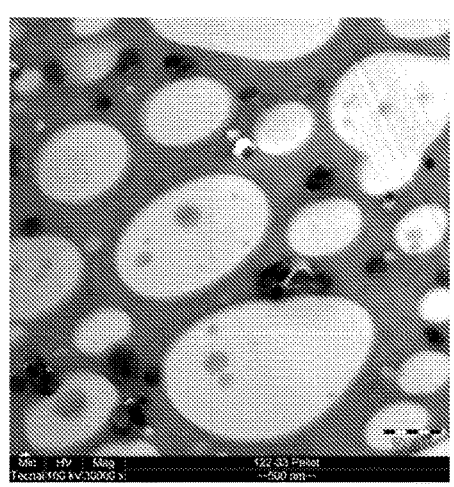
FIG. 12 shows a scanning electron microscopic ("SEM") image of the composition of example 88.
Figure 13:
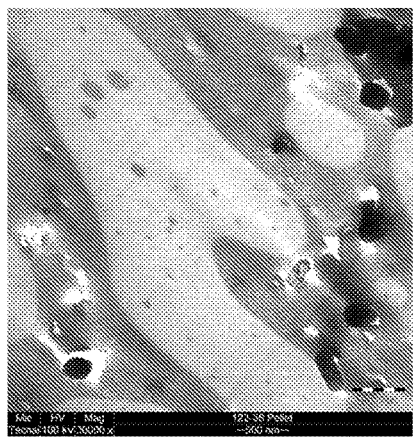
FIG. 13 shows a scanning electron microscopic ("SEM") image of the composition of example 89.

The above described and other features are exemplified by the following detailed description and Examples.

DETAILED DESCRIPTION

The inventors hereof have discovered thermoplastic compositions that have a novel combination of properties. The compositions comprise a poly(carbonate-siloxane); a polyetherimide; and a specific compatibilizer.

For example, the thermoplastic compositions can have chemical resistance to harsh reagents, strength retention, UV resistance, high flow, high impact properties, very good endurance to the anodization process after exposure to harsh chemicals (such as sulfuric acid, phosphoric acid, nitric acid, acetic acid, formic acid etc.), and can also be manufactured as very light or white materials. The inventors have discovered that addition of the compatibilizer, in particular a small amount of certain polycarbonate copolymers to compositions having a combination of polyetherimide and a poly (carbonate-siloxane), unexpectedly results in these properties. These compositions are of particular utility as components for consumer electronics.

The compositions can furthermore be formulated to have excellent electrical properties as described in the examples herein.

The individual components of the compositions are described in more detail below.

The polyetherimide of the thermoplastic composition is of formula (1)

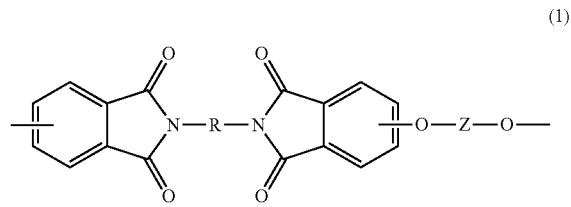

(1)

wherein R is a substituted or unsubstituted divalent organic group having 2 to 20 carbon atoms, for example a substituted or unsubstituted aromatic hydrocarbon group having 6 to 20 carbon atoms or a halogenated derivative thereof, a substituted or unsubstituted, straight or branched chain alkylene group having 2 to 20 carbon atoms, a substituted or unsubstituted cycloalkylene groups having 3 to 20 carbon atoms, or a divalent group of formula (2)

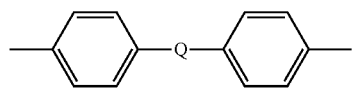

(2)

wherein Q is —O—, —S—, —C(O)—, —SO$_2$—, —SO—, or —C$_y$H$_{2y}$— wherein y is an integer from 1 to 5 or a halogenated derivative thereof.

The group Z in formula (1) is an aromatic C$_{6-24}$ monocyclic or polycyclic group optionally substituted with 1 to 6 C$_{1-8}$ alkyl groups, 1 to 8 halogen atoms, or a combination thereof, wherein the divalent bonds of the —O—Z—O— group are in the 3,3', 3,4', 4,3', or the 4,4' positions.

In an embodiment, R in formula (1) is a divalent radical of one of the following formulas (3)

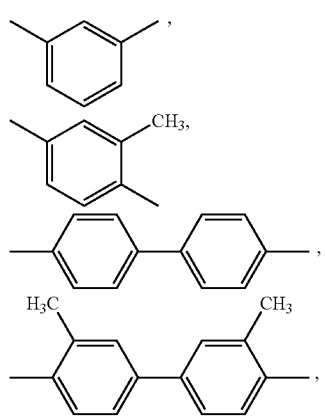

(3)

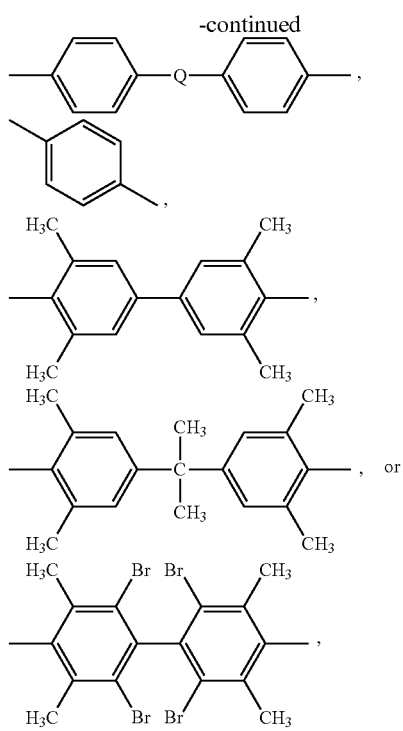

wherein Q is —O—, —S—, —C(O)—, —SO$_2$—, —SO—, or —C$_y$H$_{2y}$— wherein y is an integer from 1 to 5 or and a halogenated derivative thereof; and Z is a divalent group of formula (4)

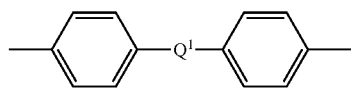

(4)

wherein Q$^1$ is —O—, —S—, —C(O)—, —SO$_2$—, —SO—, or —C$_y$H$_{2y}$— wherein y is an integer from 1 to 5. In an embodiment no halogen substituents are present in the polyetherimide. In specific embodiments, R is meta-phenylene, para-phenylene, or a combination thereof; and Z is 2,2'-bis(4-phenylene)propane. As used herein, a polyetherimide includes a combination of different polyetherimides, each independently having a structure of formula (1).

Polyetherimides can be obtained by polymerization of an aromatic bisanhydride of formula (5)

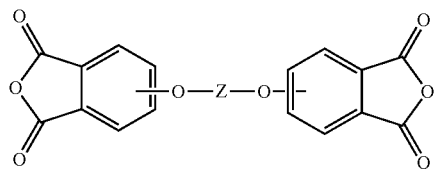

(5)

wherein Z is as described in formula (1), with a diamine of the formula H$_2$N—R—NH$_2$ (13a) wherein R is as described in formula (1). Examples of specific aromatic bisanhydrides and organic diamines are disclosed, for example, in U.S. Pat. Nos. 3,972,902 and 4,455,410 incorporated herein by reference in their entirety. Illustrative examples of aromatic bisanhydrides (5) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures comprising at least one of the foregoing.

Illustrative examples of diamines $H_2N-R-NH_2$ include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis (4-aminophenyl) sulfone, bis(4-aminophenyl) ether and 1,3-bis(3-aminopropyl) tetramethyldisiloxane. Combinations comprising at least one of the foregoing aromatic bisanhydrides can be used. Aromatic diamines are often used, especially m- and p-phenylenediamine, sulfonyl dianiline, and combinations thereof.

As used herein, the term "polycarbonate" refers to compounds having repeating units that are bisphenol carbonate units of formula (6)

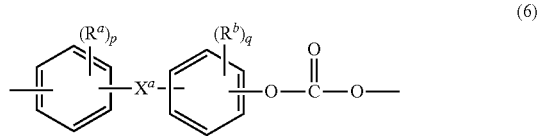

(6)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol carbonate units (6) can be derived from bisphenol A, where p and q are both 0 and $X^a$ is isopropylidene.

The polycarbonate units can be produced from dihydroxy compounds of the formula (7)

(7)

wherein $R^1$ is a bridging moiety. Thus, the bisphenol carbonate units (6) are generally produced from the corresponding bisphenol compounds of formula (8)

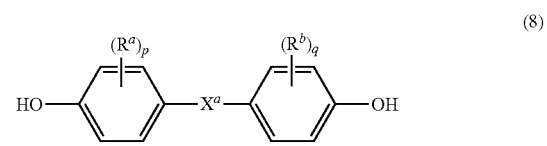

(8)

wherein $R^a$ and $R^b$, p and q, and $X^a$ are the same as in formula (6).

Some illustrative examples of specific bisphenol compounds that can be used to produce units (6) include 4,4'-dihydroxybiphenyl, bis(4-hydroxyphenyl)methane, 1,2-bis(4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, bis(4-hydroxyphenyl)ether, bis(4-hydroxyphenyl)sulfide, bis(4-hydroxyphenyl)sulfoxide, bis(4-hydroxyphenyl)sulfone, or a combination comprising at least one of the foregoing bisphenolic compounds.

Specific examples of bisphenol compounds that can be used in the production of bisphenol carbonate units (6) include 1,1-bis(4-hydroxyphenyl) methane, 1,1-bis(4-hydroxyphenyl) ethane, 2,2-bis(4-hydroxyphenyl) propane ("bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, and combinations comprising at least one of the foregoing bisphenol compounds.

A polycarbonate homopolymer refers to a polymer comprising only one type of carbonate units of formula (6). In a specific embodiment, the polycarbonate homopolymer is a linear homopolymer comprising bisphenol A carbonate units.

The poly(carbonate-siloxane) copolymers, also referred to as "PC-siloxane" or "PC-Si" can contain bisphenol carbonate units (6) and repeating siloxane units (also known as "diorganosiloxane units"). The siloxane units can be polysiloxane units of formula (9)

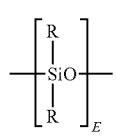
(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (9) can vary widely depending on the type and relative amount of each component in the polycarbonate composition, whether the polymer is linear, branched or a graft copolymer, the desired properties of the composition, and like considerations. In an embodiment, E has an average value of 2 to 500, 2 to 200, or 5 to 120, 10 to 100, 10 to 80, 2 to 30, or 30 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10. In an embodiment, the polysiloxane units are structural units of formula (9a)

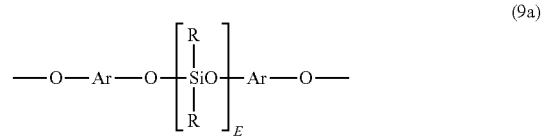
(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis (4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (9a-1)

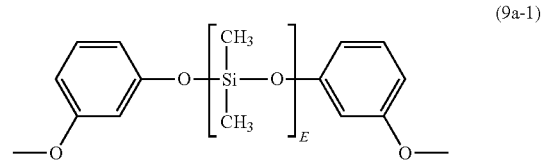
(9a-1)

or, where Ar is derived from bisphenol A, the polysiloxane has the formula (9a-2)

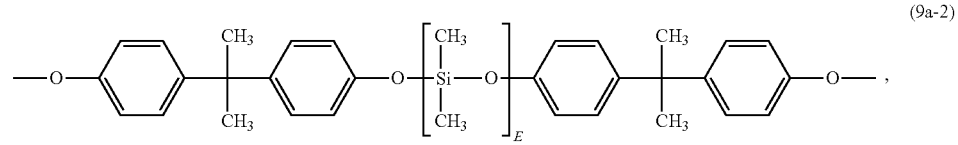
(9a-2)

or a combination comprising at least one of the foregoing can be used, wherein E has an average value as described above, specifically an average value of 2 to 200.

In another embodiment, polydiorganosiloxane units are units of formula (9b)

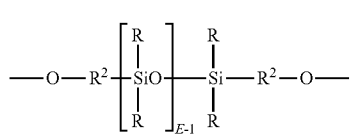

(9b)

wherein R and E are as described for formula (9), and each $R^2$ is independently a $C_{1-30}$ or $C_{2-14}$ hydrocarbylene group, for example, a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (9b-1)

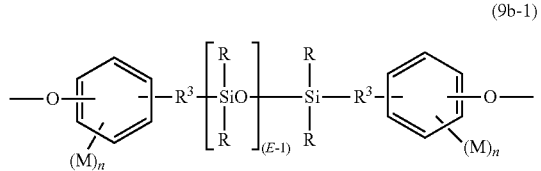

(9b-1)

wherein R and E are as defined for formula (9), and each $R^3$ is independently a divalent $C_{2-8}$ aliphatic group. Each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl. The foregoing poly(carbonate-siloxane) copolymers can be manufactured by the methods described in U.S. Pat. No. 6,072,011 to Hoover, for example.

In a specific embodiment, the polysiloxane units are eugenol-capped polysiloxane units of formula (9b-2)

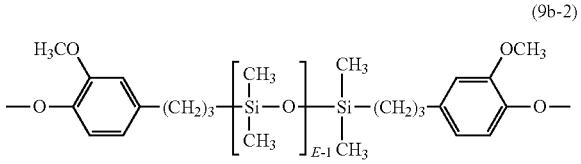

(9b-2)

where E has an average value as described above, specifically 2 to 200, 2 to 100, 2 to 90, 2 to 80, or 2 to 30, 20 to 20, or 30 to 80. In another specific embodiment, the polysiloxane units are of formula (9b-3) or (9b-4)

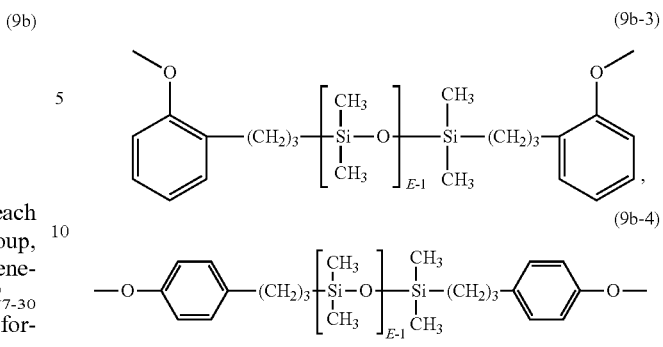

(9b-3)

(9b-4)

where E has an average value as defined above, specifically an average value of 2 to 200, 2 to 100, 2 to 90, 2 to 80, or 2 to 30, 20 to 20, or 30 to 80.

The relative amount of carbonate units (6) and polysiloxane units (9) in the PC-siloxane copolymers depends on the desired properties of the polycarbonate composition, such as impact, chemical resistance, and melt viscosity. In particular the polycarbonate copolymer is selected to have an average value of E that provides good impact and/or transparency properties, as well as to provide the desired weight percent of siloxane units in the polycarbonate composition. For example, the polycarbonate copolymers can comprise siloxane units in an amount of 0.1 to 60 weight percent (wt. %), specifically 0.5 to 55 wt. %, or 0.5 to 45 wt. %, based on the total weight of the polymers in the polycarbonate composition, with the proviso that the siloxane units are provided by polysiloxane units covalently bonded in the polymer backbone of the polycarbonate copolymer. As used herein, a poly(carbonate-siloxane) includes a combination of different poly(carbonate-siloxane)s, each independently containing bisphenol carbonate units (6) and repeating siloxane units (9), (9b-1), (9b-2), (9b-3) or (9b-4). In an embodiment, the poly(carbonate-siloxane)s in the PC-Si combination can have different siloxane contents.

A specific PC-siloxane comprises carbonate units (6) derived from bisphenol A, and second repeating siloxane units (9b-2), (9b-3), (9b-4), or a combination comprising at least one of the foregoing, specifically (9b-2). This polycarbonate copolymer can comprise the siloxane units in an amount of 0.1 to 60 weight percent (wt. %), 0.5 to 55 wt. %, 0.5 to 45 wt. % 0.5 to 30 wt. %, or 0.5 to 20 wt. %, based on the total weight of the polycarbonate copolymer, with the proviso that the siloxane units are covalently bound to the polymer backbone of the polycarbonate copolymer. In an embodiment, the remaining units are bisphenol units (6). Transparency can be achieved in this embodiment when E has an average value of 4 to 50, 4 to 15, specifically 5 to 15, more specifically 6 to 15, and still more specifically 7 to 10. The transparent PC-siloxanes can be manufactured using one or both of the tube reactor processes described in U.S. Patent Application No. 2004/0039145A1 or the process described in U.S. Pat. No. 6,723,864 may be used to synthesize the poly(siloxane-carbonate) copolymers.

These and other methods for the manufacture of the PC-siloxane copolymers are known. The PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with polycarbonate standards.

The thermoplastic composition comprises a compatibilizer component selected from a poly(carbonate-arylate ester), a phthalimidine copolycarbonate, or a combination thereof.

A poly(carbonate-arylate ester) comprises repeating bisphenol carbonate units (6) and repeating arylate ester units of formula (10)

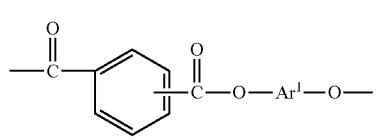

(10)

wherein $Ar^1$ is a $C_{6-32}$ hydrocarbyl group containing at least one aromatic group, e.g., a phenyl, naphthalene, anthracene, or the like. In an embodiment, $Ar^1$ is derived from an aromatic bisphenol (8), a monoaryl dihydroxy compound, or a combination comprising different bisphenol or monoaryl dihydroxy compounds. Thus, arylate ester units (10) can be derived by reaction of isophthalic acid, terephthalic acid, or a combination comprising at least one of the foregoing (referred to herein as a "phthalic acid"), with any of the aromatic bisphenols described above, a monoaryl dihydroxy compound, or a combination comprising at least one of the foregoing. The molar ratio of isophthalate to terephthalate can be 1:99 to 99:1, or 80:20 to 20:80, or 60:40 to 40:60.

The poly(carbonate-arylate ester) comprising first bisphenol carbonate units (6) and arylate ester units (10) can be alternating or block copolymers of formula (11)

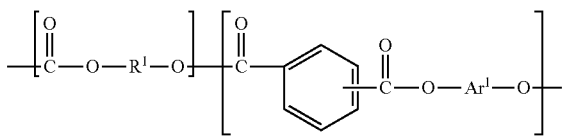

(11)

wherein $R^1$ and $Ar^1$ are as defined in formulae (7) and (10), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the polycarbonate composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the polycarbonate composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the polycarbonate composition.

Additional carbonate units derived from the dihydroxy compound used to form the arylate ester units (10) can also be present as described above, for example in amounts of less than 20 mole %, less than 10 mole %, or less than 5 mole %, based on the total moles of units in the polycarbonate copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate)-co-(bisphenol arylate ester) comprising carbonate units (6), specifically bisphenol carbonate units, even more specifically bisphenol A carbonate units and repeating bisphenol arylate ester units. Bisphenol arylate units comprise residues of phthalic acid and a bisphenol, for example a bisphenol (6). In an embodiment the bisphenol arylate ester units are of formula (10a)

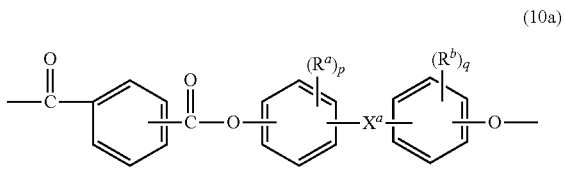

(10a)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, p and q is each 0 or 1, and $R^a$ and $R^b$ are each a $C_{1-3}$ alkyl group, specifically methyl, disposed meta to the oxygen on each ring, and $X^a$ is an alkylidene of the formula —C($R^c$)($R^d$)— wherein $R^c$ and $R^d$ are each $C_{1-6}$ alkyl. The bisphenol can be bisphenol A, where p and q are both 0 and $X^a$ is isopropylidene.

In a specific embodiment, the poly(carbonate-arylate ester) is a poly(bisphenol A carbonate)-co-(bisphenol A-phthalate-ester) of formula (11a)

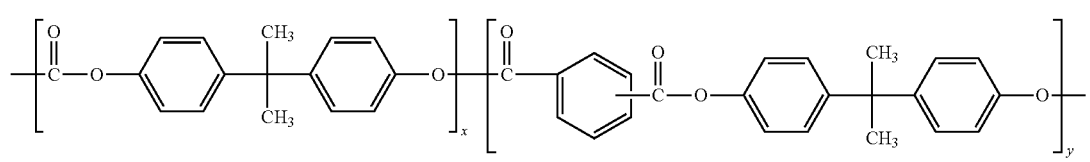

(11a)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (11a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE), and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific poly(carbonate-arylate ester) is a poly(carbonate)-co-(monoaryl arylate ester) containing carbonate units (6) and repeating monoaryl arylate ester units of formula (10b)

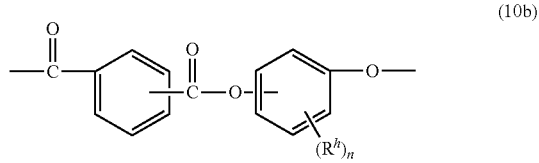

(10b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (11b)

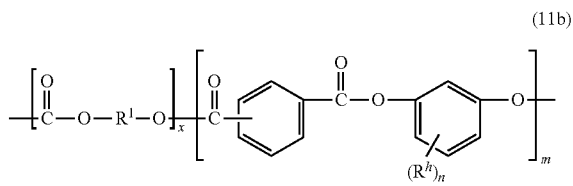

(11b)

wherein $R^1$ is as defined in formula (7) and $R^h$, and n are as defined in formula (10b), and the mole ratio of x:m is 99:1 to 1:99, specifically 80:20 to 20:80, or 60:40 to 40:60.

Specifically, the monoaryl-arylate ester unit (10b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (10c)

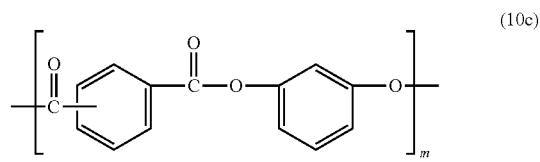

(10c)

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (11c)

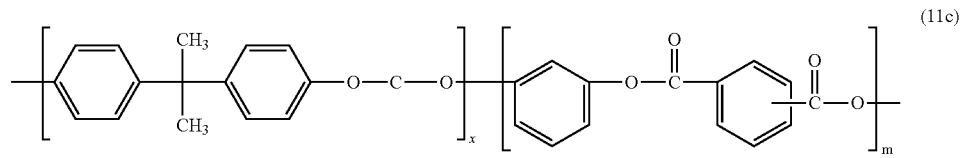

(11c)

wherein m is 4 to 100, 4 to 90, 5 to 70, more specifically 5 to 50, or still more specifically 10 to 30, and the mole ratio of x:n is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of formula (12) and bisphenol ester units of formula (10a).

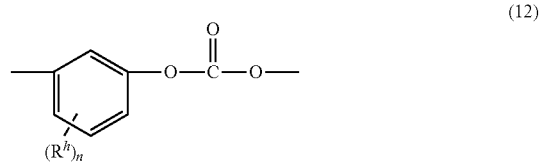

(12)

The bisphenol ester units can be bisphenol A phthalate ester units of the formula

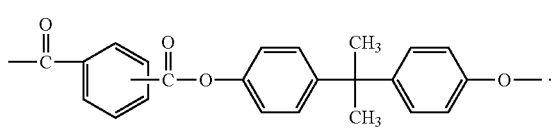

(10d)

In an embodiment, poly(bisphenol A carbonate)-co-(isophthalate-terephthalate-resorcinol ester) (11c) comprises 1 to 20 mol % of bisphenol A carbonate units, 60 to 99 mol % of isophthalic acid-terephthalic acid-resorcinol ester units, and optionally 1 to 20 mol % of resorcinol carbonate units, isophthalic acid-terephthalic acid-bisphenol A phthalate ester units, or a combination comprising at least one of the foregoing. In another embodiment, poly(bisphenol A carbonate)-co-(isophthalate-terephthalate-resorcinol ester) (11c) 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof.

In another embodiment, the poly(carbonate-arylate ester) copolymers further comprise siloxane units (also known as "diorganosiloxane units"). In a specific embodiment these copolymers comprises carbonate units (6) derived from a bisphenol (8), specifically bisphenol-A; monoaryl arylate ester units (10b), and siloxane units. Still more specifically, the poly(carbonate-arylate ester) copolymers comprises bisphenol-A carbonate units, ITR ester units (10c), and siloxane units (9). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The relative amount of polysiloxane units (9) in the ITR-PC-siloxane copolymers depends on the desired properties of the thermoplastic composition, such as impact, chemical resistance, and melt viscosity. In particular the poly(carbonate-arylate ester) is selected to have an average value of E that provides good impact and/or transparency properties, as well as to provide the desired weight percent of siloxane units in the thermoplastic composition. For example, the poly(carbonate-arylate ester)s can comprise siloxane units in an amount of 0.3 to 30 weight percent (wt. %), specifically 0.5 to 25 wt. %, or 0.5 to 15 wt. %, based on the total weight of the polymers in the thermoplastic composition, with the proviso that the siloxane units are provided by polysiloxane units covalently bonded in the polymer backbone of the poly(carbonate-arylate ester).

In an embodiment, the PC-ITR-siloxane copolymers comprise 1 to 40 mol %, or 1 to 20 mol % of bisphenol-A carbonate units, 50 to 95 mol % of ITR ester units (10c), and an amount of polysiloxane units (9b), specifically (9b-1), even more specifically (9b-2), (9b-3), (9b-4) or a combination comprising at least one of the foregoing (specifically of formula 9b-2) in an amount effective to provide 0.1 to 10 wt. % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (9b-2), (9b-3), (9b-4) or a combination comprising at least one of the foregoing (specifically of formula 9b-2) effective to provide 0.1 to 10 wt. % of siloxane units, each based on the total copolymer.

Other carbonate units, other ester units, or a combination thereof can be present in the PC-ITR-siloxane copolymers, in a total amount of 1 to 20 mole % based on the total moles of units in the copolymers, for example resorcinol carbonate units, and bisphenol-A phthalate ester units of the formula. In an embodiment, the ITR-PC-siloxane comprises 1 to 20 mol % of bisphenol-A carbonate units, 60-98 mol % of isophthalic acid-terephthalic acid-resorcinol ester units, and optionally 1 to 20 mol % of resorcinol carbonate units (12), isophthalic acid-terephthalic acid-bisphenol-A ester units (10d), or a combination thereof, together with the siloxane units.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of about 1.0 ml/min with methylene chloride as the eluent.

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

together. Thus, the poly(siloxane-imide) copolymer can be a block, random, or graft copolymer.

Examples of specific poly(siloxane-etherimide) are described in U.S. Pat. Nos. 4,404,350, 4,808,686 and 4,690,997. In an embodiment, the poly(siloxane-etherimide) has units of formula (14)

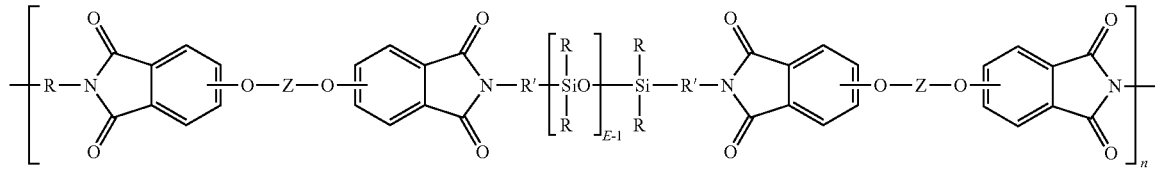

The thermoplastic composition can also comprise a poly (siloxane-etherimide) copolymer comprising siloxane blocks (9) and polyetherimide units of formula (1). In this embodiment, the poly(siloxane-etherimide) polymer is a block or graft copolymer comprising etherimide units of formula (1) and blocks of polysiloxane units, i.e., a poly (siloxane-co-etherimide), referred to herein as a "(polyetherimide-siloxane)." Block poly(siloxane-etherimide) copolymers comprise siloxane blocks and etherimide blocks in the polymer backbone. The siloxane blocks and the polyetherimide units can be present in random order, as blocks (i.e., AABB), alternating (i.e., ABAB), or a combination thereof. Graft poly(siloxane-etherimide) copolymers are non-linear copolymers comprising the siloxane blocks connected to linear or branch polymer backbone comprising etherimide blocks.

The poly (siloxane-etherimide)s can be formed by polymerization of an aromatic bisanhydride (5) and a diamine component comprising an organic diamine of the formula $H_2N-R-NH_2$ as described above or mixture of diamines, and a polysiloxane diamine of the formula (13b):

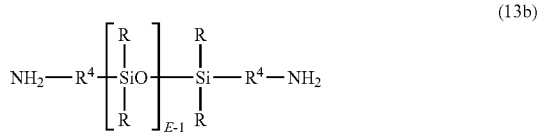

wherein R and E are as described in formula (9), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (13b) are well known in the art.

In some poly(siloxane-etherimide)s the diamine component can contain 10 to 90 mole percent (mol %), or 20 to 50 mol %, or 25 to 40 mol % of polysiloxane diamine (13b) and 10 to 90 mol %, or 50 to 80 mol %, or 60 to 75 mol % of diamine (13a), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (13a) and (13b) with aromatic dianhydrides (5), to make polyimide blocks that are subsequently reacted wherein R and E of the siloxane are as in formula (9), the R and Z of the imide are as in formula (1), R' is the same as $R^4$ as in formula (13b), and n is an integer from 5 to 100. In a specific embodiment, the R of the etherimide is a phenylene, Z is a residue of bisphenol A, R' is n-propylene, and each R of the siloxane is methyl.

The relative amount of polysiloxane units and etherimide units in the poly(siloxane-etherimide) depends on the desired properties, and are selected using the guidelines provided herein. In particular, as mentioned above, the block or graft poly(siloxane-etherimide) copolymer is selected to have a certain average value of E, and is selected and used in amount effective to provide the desired wt % of polysiloxane units in the composition. In an embodiment the poly(siloxane-etherimide) comprises 10 to 50 wt %, 10 to 40 wt %, or 20 to 35 wt % polysiloxane units, based on the total weight of the poly(siloxane-etherimide).

The thermoplastic compositions can include various other polymers to adjust the properties of the thermoplastic compositions, with the proviso that the other polymers are selected so as to not adversely affect the desired properties of the thermoplastic composition significantly. For example, combination of a polycarbonate copolymer as described above and a homopolycarbonate having repeating units (1) such as a bisphenol A homopolycarbonate can still provide thermoplastic compositions having the desirable impact, colorability, and chemical resistance. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt. %, less than 40 wt. %, less than 30 wt. %, less than 20 wt. %, or less than 10 wt. % of the total composition. In an embodiment, no other polymers are present. In a specific embodiment, no polymers containing halogen are present in the thermoplastic compositions.

The thermoplastic compositions can include various additives, with the proviso that the additive(s) are selected so as to not adversely affect the desired properties of the thermoplastic composition significantly, in particular high impact, stable colorability, and chemical resistance. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, impact modifiers, and anti-drip agents. A combination of additives can be used. In general, the additives are used in the amounts generally known to be effective. The total amount of additives (other than any filler or reinforcing agents) is generally 0.01 to 25 parts per hundred parts by the total weight of the polymers in the composition (PHR).

In an exemplary embodiment, glass fibers are used as the reinforcing fillers. Useful glass fibers can be formed from any type of fiberizable glass composition including those prepared from fiberizable glass compositions known as "E-glass," "A-glass," "C-glass," "D-glass," "R-glass," and "S-glass," as well as E-glass derivatives that are fluorine-free and/or boron-free. Most reinforcement mats include glass fibers formed from E-glass.

Commercially produced glass fibers generally having filament diameters of 4.0 to 35.0 micrometers may be included in the compositions. The fibers can have a round or flat cross-section. The filaments may be made by standard processes, e.g., by steam or air blowing, flame blowing, and mechanical pulling. Exemplary filaments for polymer reinforcement are often made by mechanical pulling. The glass fibers may be sized or unsized. Sized glass fibers are generally coated on at least a portion of their surfaces with a sizing composition selected for compatibility with the polymer matrix material. The sizing composition facilitates wet-out and wet-through of the organic polymer upon the fiber strands and assists in attaining selected physical properties in the composition.

The glass fibers are beneficially glass strands that have been sized. In preparing the glass fibers, a number of filaments can be formed simultaneously, sized with the coating agent, and then bundled into what is called a strand. Alternatively the strand itself can be first formed of filaments and then sized. The glass fibers can be used in lengths of 0.5 millimeter to 2 centimeters. In some embodiment, the glass fiber reinforcing agents can be used in lengths of 1 millimeter to 1 centimeter.

The reinforcing agents, specifically the glass fibers, are used in effective amounts, for example 1 to 200 parts by weight, based on 100 parts by weight of the polymer composition, more specifically 30 to 150 parts by weight, based on 100 parts by weight of the polymer composition.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 25 parts by weigh PHR.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 20 parts by weight PHR.

The use of pigments such as titanium dioxide produces white compositions, which are commercially desirable. Pigments such as titanium dioxide (or other mineral fillers) can be present in the thermoplastic compositions in amounts of 0.1 to 30 wt. %, 0.5 to 25 wt. %, 1 to 20 wt. %, or 5 to 15 wt. %, each based on the total weight of the composition.

Titanium dioxide can be coated or uncoated. In an embodiment, the titanium dioxide is an inorganic coated titanium dioxide without an organic coating. In another embodiment, the titanium dioxide is an organic coated titanium dioxide with an organic coating. The organic coating comprises polysiloxane. Coated titanium dioxide can provide improved colorability to the thermoplastic composition.

The composition can have any suitable color including white, light gray, and/or combinations thereof. The white or light gray color can exhibit an L* value greater than or equal to 80. A composition having a white or light gray color can comprise an amount of titanium dioxide in amounts of 0.1 to 30 wt. %, 0.1 to 25 wt. %, 0.1 to 20 wt. %, or 0.1 to 15 wt. %, each based on the total weight of the composition.

The composition can have any suitable color including gray, black, and/or combinations thereof. The gray or black color can exhibit an L* value of below 80. A composition having a gray or black color can comprise an amount of carbon black within 0.001 to 25 parts per hundred by weight (pph), or 0.001 to 15 pph, or 0.001 to 5 pph, or 0.01 to 10 pph, or 0.1 to 15 pph.

Light stabilizers and/or ultraviolet light (UV) absorbing additives, also referred to as UV stabilizers, can also be used. Examples of suitable UV stabilizers can include benzophenones, triazines, benzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, and combinations comprising at least one of the foregoing.

Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); poly[(6-morpholino-s-triazine-2,4-diyl)[2,2,6,6-tetramethyl-4-piperidyl) imino]-hexamethylene[(2,2,6,6-tetramethyl-4-piperidyl)imino], 2-hydroxy-4-octyloxybenzophenone (UVINUL™3008), 6-tert-butyl-2-(5-chloro-2H-benzotriazole-2-yl)-4-methylphenyl (UVINUL3026), 2,4-di-tert-butyl-6-(5-chloro-2H-benzotriazole-2-yl)-phenol (UVINUL™3027), 2-(2H-benzotriazole-2-yl)-4,6-di-tert-pentylphenol (UVINUL™3028), 2-(2H-benzotriazole-2-yl)-4-(1,1,3,3-tetramethylbutyl)-phenol (UVINUL3029), 1,3-bis[(2'cyano-3',3'-diphenylacryloyl)oxy]-2,2-bis-{[(2'-cyano-3',3'-diphenylacryloyl) oxy]methyl}-propane (UVINUL3030), 2-(2H-benzotriazole-2-yl)-4-methylphenol (UVINUL™3033), 2-(2H-benzotriazole-2-yl)-4,6-bis(1-methyl-1-phenyethyl) phenol (UVINUL3034), ethyl-2-cyano-3,3-diphenylacrylate (UVINUL™3035), (2-ethylhexyl)-2-cyano-3,3-diphenylacrylate (UVINUL™3039), N,N'-bisformyl-N,N'-bis(2,2,6,6-tetramethyl-4-piperidinyl)hexamethylendiamine (UVINUL™4050H), bis-(2,2,6,6-tetramethyl-4-piperidyl)-sebacate (UVINUL4077H), bis-(1,2,2,6,6-pentamethyl-4-piperdiyl)-sebacate+methyl-(1,2,2,6,6-pentamethyl-4-piperidyl)-sebacate (UVINUL4092H) 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis [(2-cyano-3,3-diphenylacryloyl)oxy]-2,2-bis[[(2-cyano-3,3-diphenylacryloyl)oxy]methyl]propane; TINUVIN™ 234; TINUVIN™ 360, nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of thermoplastic and impact modifier. UV absorbers that can be particularly useful with the thermoplastic compositions disclosed herein include 2-(2H-benzotriazol-2-yl)-4-(1,1,3,3-tetramethylbutyl)-phenol (e.g., CYASORB™ 5411 commercially available from Cytec Industries, Inc., Woodland Park, N.J.) and 2,2'-(1,4-phenylene)bis(4H-3,1-benzoxazin-4-one) (e.g., CYASORB™ UV-3638, commercially available from Cytec Industries, Inc., Woodland Park, N.J.), and combinations comprising at least one of the foregoing. In another embodiment, the UV stabilizer comprises 2,2"-Methylenebis(6-(2H-benzotriazol-2-yl)-4-4(1,1,3,3,-tetramethylbutyl)phenol, available as LA-31RG having a CAS 103597-45-1; 2,2'-(p-phenylene) bis-4H-3,1-Benzoxazin-4-one", available as Cyasorb UV-3638, and having CAS: 18600-59-4.

The UV stabilizers can be present in an amount of up to 15 wt. %, for example, 0.01 to 6 wt %, or 0.01 to 1 wt %, specifically 0.1 to 2 wt %, and more specifically, 0.15 to 4 wt %, or 0.15 to 6 wt %, each based upon the total weight of the thermoplastic composition.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler. In another embodiment, depending on the particular organophosphorus compound used, the thermoplastic compositions can comprise from 0.3 to 20 wt. %, or 0.5 to 15 wt. %, or 3.5 to 12 wt. % of the organophosphorus flame retardant, each based on the total weight of the composition. Specifically, the organophosphorus compounds can be bisphenol A bis(diphenyl phosphate), triphenyl phosphate, resorcinol bis(diphenyl phosphate), tricresyl phosphate, or a combination comprising at least one of the foregoing.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Alternatively, the thermoplastic composition can be essentially free of chlorine and bromine. "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or coextruded with a coating or other layer) in the form of a sheet and/or can be processed through calendaring rolls to form the desired sheet.

The thermoplastic compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less. The same or similar values can be obtained in components having a wide range of thicknesses, for example from 0.1 to 10 mm, or 0.5 to 5 mm.

The thermoplastic compositions can further have good melt viscosities, which aid processing. The thermoplastic compositions can have a melt volume flow rate (MVR, cubic centimeter per 10 minutes (cc/10 min) of 4 to about 30, greater than or equal to 6, greater than or equal to 8, greater than or equal to 10, greater than or equal to 12, greater than or equal to 14, greater than or equal to 16, greater than or equal to 18, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The thermoplastic compositions can further have excellent impact properties, in particular multiaxial impact (MAI), and ductility. The compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, specifically 100%, determined at 23° C. at an impact speed of 4.4 m/second in accordance with ISO 6603 on discs with a thickness of 3.2 mm. These values can be obtained in articles having a wide range of thicknesses, for example from 0.1 to 10 mm, or 0.5 to 5 mm. In some embodiments, the composition can have an MAI equal to or higher than 100 J and a high ductility (80% or greater, for example 100%) at lower temperatures such as 10° C., 0° C., −10° C., −20° C. and −30° C. In some embodiments, the compositions can have an Izod notched impact energy of at least 10 $kJ/m^2$, at least 20 $kJ/m^2$, or at least 30 $kJ/m^2$ measured at 23° C. according to ISO 180/1A using a multipurpose test specimen in accordance with ISO 3167 TYPE A.

The thermoplastic composition is able to be metallized with a metal such as, but not limited to aluminum, preferably wherein the aluminum is deposited and anodized to provide desirable characteristics such as corrosion resistance and wear resistance, better adhesion to paints and dyes vs. bare metal.

Most polymeric materials may not survive the various mechanical/chemical treatments (such as pre-treatment, etching, milling, desmutting, anodizing, coloring, sealing) on the plastic material typically involved during the anodization process Advantageously, the thermoplastic composition is able to endure the anodization process by maintaining its properties and structural integrity.

The anodization processes are not particularly limited. In an embodiment, preceding the anodization process, wrought alloys are cleaned in either a hot soak cleaner or in a solvent bath and may be etched in sodium hydroxide (normally with added sodium gluconate), ammonium bifluoride or brightened in a mix of acids. Cast alloys are normally best just cleaned due to the presence of intermetallic substances unless they are a high purity alloy such as LMO.

The anodized aluminium layer is grown by passing a direct current through an electrolytic solution, with the aluminium object serving as the anode (the positive electrode). The current releases hydrogen at the cathode (the negative electrode) and oxygen at the surface of the aluminium anode, creating a build-up of aluminium oxide. Alternating current and pulsed current is also possible but rarely used. The voltage required by various solutions may range from 1 to 300 V DC, although most fall in the range of 15 to 21 V. Higher voltages are typically required for thicker coatings formed in sulfuric and organic acid. The anodizing current varies with the area of aluminium being anodized, and typically ranges from 30 to 300 amperes/$meter^2$ (2.8 to 28 ampere/$ft^2$).

Aluminium anodizing is usually performed in an acid solution which slowly dissolves the aluminium oxide. The acid action is balanced with the oxidation rate to form a coating with nanopores, 10-150 nm in diameter. These pores are what allow the electrolyte solution and current to reach the aluminium substrate and continue growing the coating to greater thickness beyond what is produced by autopassivation. However, these same pores will later permit air or water to reach the substrate and initiate corrosion if not sealed. They are often filled with colored dyes and/or corrosion inhibitors before sealing. Because the dye is only superficial, the underlying oxide may continue to provide corrosion protection even if minor wear and scratches may break through the dyed layer.

Conditions such as electrolyte concentration, acidity, solution temperature, and current must be controlled to allow the formation of a consistent oxide layer. Harder, thicker films tend to be produced by more dilute solutions at lower temperatures with higher voltages and currents. The film thickness can range from under 0.5 micrometers for bright decorative work up to 150 micrometers for architectural applications.

The thermoplastic composition can further have excellent electrical tracking properties. Electrical tracking is defined as the formation of conductive pathways on the surface of a polymer under certain conditions and at a certain voltage. Electrical tracking in a thermoplastic material can be a source of fire in thermoplastic parts that are used in electrical applications and so resistance to electrical tracking is often an important safety requirement for a thermoplastic composition, which is used in certain electrical applications.

Electrical tracking resistance is the ability of a thermoplastic formulation to resist electrical tracking under certain conditions and certain voltages. Electrical tracking resistance on a sample of a thermoplastic composition can be measured using a test procedure identified as ASTM D-2303. A common method of reporting the electrical tracking resistance of a thermoplastic is by its comparative tracking index rating (CTI). The CTI rating of a thermoplastic composition indicates how resistant a thermoplastic material is to electrical tracking at certain voltages. CTI ratings range from CTI-0 to CTI-5 with a CTI-1 rating indicating that a thermoplastic is more resistant to electrical tracking than a plastic with a lower CTI rating (for example CTI-3).

Shaped or molded articles comprising the thermoplastic compositions are also provided. The thermoplastic compositions can be formed into useful articles by a variety of techniques, such as injection molding, extrusion (including multilayer extrusion), rotational molding, blow molding, foaming and casting or molding, 3-dimensional printing, and thermoforming. Thus the thermoplastic compositions can be used to form a foamed article, a molded article, a thermoformed article, a printed article, an extruded sheet (which includes films), a multilayer extruded sheet, a cast or an extruded fiber or filament (for 3-dimensional printing, for example), one or more layers of a multi-layer article (e.g. a cap layer), a substrate for a coated article, or a substrate for a metallized article.

In an embodiment, the thermoplastic compositions are useful for the manufacture of multilayered sheets, wherein any one or more layers can comprise a composition of any one or more of the embodiments of this disclosure. For example, the multilayer sheets can comprise a first layer (e.g., a base layer) comprising a composition of any embodiments of this disclosure and a second layer (e.g., a cap layer) disposed on a side of the first layer. The second layer is selected based on the desired function and properties (e.g., transparency, weatherability, ultraviolet light resistance, scratch resistance, and the like). Exemplary materials for the cap layer include polyacetals, polyacrylonitriles, polyamides, polydienes (e.g., polybutadiene), polyethers, polyetherether ketones, polyetherimides, polyethersulfones, polyimides, polyketones, polyolefins, polysiloxanes, polystyrenes, polysulfones, polyvinyl acetates, polyvinyl chlorides, polyvinylidene chlorides, polyvinyl esters, polyvinyl ethers, polyvinyl ketones, polyvinyl pyridines, polyvinyl pyrrolidones, and the like, or a combination comprising at least one of the foregoing. Specific materials for the second layer include polyesters such as poly(ethylene terephthalate), cycloaliphatic polyester copolymers, poly(($C_{1-4}$alkylene) naphthalate), and poly(butylene terephthalate), polyfluorocarbons (e.g, poly(vinyl fluoride), poly (tetrafluoroethylene), and poly(vinylidene fluoride)) polyfluorochlorocarbons, ($C_{1-6}$alkyl)(meth)acrylates (e.g., poly(methyl methacrylate ("PMMA"), polyurethanes, acrylonitrile-butadiene-styrene (ABS), other polycarbonates, or a combination comprising at least one of the foregoing. In an embodiment, the cap layer is selected so as to not significantly adversely affect the desired properties of the compositions described herein, in particular the low smoke and flame retardant properties. In an embodiment one or more of the layers is thermoformable.

Still other layers can be present in the multilayer article as known in the art, for example various adhesive layers, primer layers, substrate layer, decorative or visual effect layer, and additional other layers. The various layers can be coextruded, laminated, or adhered to form the multilayer sheet. Generally, the overall thickness of the sheet can be, for example 1 micrometer to 1 centimeter, or 5 micrometers to 5 millimeters. More particularly, the sheet can have a thickness of 1 mil (25.4 micrometers (μm)) to 500 mils (12,700 μm), or 5 mils (127 μm) to 40 mils (1016 μm), or 5 mils (127 μm) to 30 mils (762 μm). The multilayer articles may be used for many applications, such as for skylights, signs, glazing, laminates, packaging food, clothing, pharmaceutical products, multi-wall sheets, and the like.

The above-described compositions, in particular compositions comprising a polyetherimide, poly(carbonate-siloxane) and compatibilizer are useful for the manufacture of components for consumer electronics. One key formulation challenge is retention of color during UV-aging while maintaining a range of other properties such as one or more of heat aging, tensile strength, elongation at break, flame retardance and flexibility. Compositions having improved color retention are of continuing interest for use in the consumer electronics area. In an embodiment, the compositions are color stable, i.e., the color of the compositions of experience a Delta E after aging of less than 20, less than 10, more preferably less than 5, after 300 hours of exposure to UV radiation, for example according to ASTM D4459.

The compositions can also be high gloss, where gloss may be measured at 60° according to ASTM D523.

Thus, the compositions containing a polyetherimide, poly (carbonate-siloxane) and compatibilizer, and up to 25 wt. % of titania can be used in the manufacture of components of a consumer electronic device, wherein the component is a housing, a frame, a clip, a bezel, a bushing, a flange, a strut, a prong, a fin, or a rib. By consumer electronics device (CED) is meant a cellular phone (e.g., a smartphone), a tablet computer, a laptop computer, a portable media player, a television, a portable gaming device, a gaming console, a gaming controller, a remote control, an appliance (e.g. a toaster, a refrigerator, a bread maker, a microwave, a vacuum cleaner, etc.) a power tool (a drill, a blender, etc.), a robot (e.g. an autonomous cleaning robot, a care giving robot, etc.), a toy (e.g. a doll, a figurine, a construction set, a tractor, etc.), a greeting card, a home entertainment system, an active loudspeaker, a soundbar, or the like.

The compositions are also useful in the manufacture of exterior or interior components of automotive, truck, motorcycle, or other vehicles (generically "automotive parts"), including panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, and running boards.

The thermoplastic compositions are further illustrated by the following non-limiting examples.

EXAMPLES

Materials for the following examples are listed in Table 1. Amounts of each component in the Examples are in wt. %, based on the total weight of the composition, unless otherwise indicated.

TABLE 1

| Component | Chemical Description | Source |
|---|---|---|
| PC | Bisphenol-A polycarbonate, manufactured by interfacial polymerization, Mw = 28,000 to 32,000 g/mol (determined via GPC using polycarbonate standards), manufactured by interfacial polymerization | SABIC |
| PC-Si | PDMS (polydimethylsiloxane) - bisphenol A copolymer, 6 mol % siloxane, having an average block length of 40-50 units, Mw 23,000 g/mol (determined via GPC using polycarbonate standards), manufactured by interfacial polymerization | SABIC |
| PC-Si (p) | PDMS (polydimethylsiloxane) - Bisphenol A Polycarbonate copolymer, produced via interfacial polymerization, 20 wt. % siloxane, average PDMS block length of 40-50 units, Mw about 30,000 g/mol as determined by GPC using polycarbonate standards, para-cumylphenol (PCP) end-capped | SABIC |
| PEI | Poly(etherimide) made via reaction of bisphenol-A dianhydride with equimolar amount of m-phenylene diamine, Mw = 31,000 to 35,000 g/mol (determined via GPC using polystyrene standards) | SABIC |
| PEI-Si | A random poly(etherimide-dimethylsiloxane) copolymer comprising structural units derived from m-phenylene diamine, BPADA, and an aminopropyl terminated polydimethylsiloxane containing on average 10 silicon atoms, with 37 + 2 wt. % siloxane content; Mw about 38,500 amu determined by GPC relative to PC standards (SILTEM ® D900 0) | SABIC |
| PC-Ester 1 | Poly(phthalate-carbonate) copolymer, 81 mol % ester, molecular weight = 28,500 g/mol (determined via GPC using polycarbonate standards), manufactured via interfacial polymerization | SABIC |
| ITR-PC-Si | Polysiloxane-ITR (Isophthalic acid-terephthalic acid-resorcinol) - bisphenol-A copolyestercarbonate copolymer, ester content 83 mol %, siloxane content 1 wt % (average siloxane chain length about 10), interfacial polymerization, Mw about 24,500 g/mol, para-cumyl phenol end-capped | SABIC |
| Irgafos 168 | Tris(2,4-di-(tert)-butylphenyl)phosphite | Ciba |
| UV Stabilizer 1 | 2-(2'hydroxy-t-octylphenyl)-benzotriazole | |
| UV Stabilizer 2 | (2-(4,6-Diphenyl-1,3,5-triazin-2-yl)-5-hexyloxyphenol) | |
| UV Stabilizer 4 | 2-Hydroxyphenyl-s-triazine derivative | |
| UV Stabilizer 5 | 2,2'-Methylene bis[4-(1,1,3,3-tetramethylbutyl)-6-(2H-benzotriazole-2-yl)phenol] | |
| UV Stabilizer 6 | Phenol, 2-(2H-benzotriazol-2-yl)-4,6-bis(1-methyl-1-phenylethyl | |
| UV Stabilizer 7 | CAS: 103597-45-1 2,2'-Methylenebi[6-(2H-Benzotriazol-2-yl)-4-(1,1,3,3-tetramethylbutyl)phenol] | |
| SAN-Gel | Gel type additive having 50-60 wt % styrene acrylonitrile copolymer (SAN) | |

The tests performed are summarized in Table 2.

TABLE 2

| Description | Test | Specimen | Property | Units |
|---|---|---|---|---|
| Izod Notched Impact, 5.5 J, various temps. | ISO 180/1A | Multi-purpose ISO 3167 Type A, 3 mm thick | INI 3 mm | kJ/m$^2$ |
| Izod Notched Impact, 5.5 J, various temps. | ISO 180/1A | Multi-purpose ISO 3167 Type A, 4 mm thick | INI 4 mm | kJ/m$^2$ |
| ASTM Izod Notched Impact, various temps. | ASTM D256-2010 | ASTM Impact bar, 3.2 mm thick | ASTM INI | J/m |
| Yield stress retention | ISO 527 | ISO Tensile bar | YS % | % |
| Elongation to break retention | ISO 527 | ISO Tensile bar | EB % | % |

Chemical resistance tests were performed according to the following protocol. ISO tensile bars were placed in jigs to bring them under 0.5% or 1% strain. While holding two Q-tips together, about 1 ml of chemical is applied to the specimen, where the chemical is spread in a circular motion around the center section and out toward the ends of the specimen until it reaches 25 mm in length. Any extra chemical that is on the sides of the bars is wiped off. Bars in the jigs are left for 24 hrs or 120 hrs at room temperature. After exposure, bars are conditioned for 24 hrs at room temperature and 50% relative humidity, and tested for tensile testing. The retention of yield stress and elongation to break is calculated compared to the reference sample that did not undergo the chemical exposure step.

The tests executed were indicative tests performed according to their respective ISO standards, but, were not executed by an officially certified test institute.

Blending, Extrusion and Molding Conditions.

The compositions were made as follows. All solid additives (e.g., stabilizers, colorants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. It will be recognized by one skilled in the art that the method is not limited to these temperatures or processing equipment.

Extrusion of all materials was performed on a 25 mm Werner-Pfleiderer ZAK twin-screw extruder (L/D ratio of 33:1), with a vacuum port located near the die face. The extruder has 9 zones, which were set at temperatures of 40° C. (feed zone), 200° C. (zone 1), 250° C. (zone 2), 280° C. (zone 3), and 290-310° C. (zone 4 to 8). Screw speed was 300 rpm and throughput was between 15 and 25 kg/hr.

The compositions were molded after drying at 100-110° C. for 6 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Examples 1-4

Examples 1-4 compare the impact properties and chemical resistance of compositions containing PC-Si and 10% PEI, with and without compatibilizer. Formulations and results are shown in Table 3.

TABLE 3

|  |  | CEx 1 | CEx 2 | Ex 3 | Ex 4 |
|---|---|---|---|---|---|
| COMPONENTS |  |  |  |  |  |
| PC-Si | pbw | 99.9 | 89.9 | 84.9 | 84.9 |
| ITR-PC-Si | pbw |  |  | 5 |  |
| PC-Ester 1 | pbw |  |  |  | 5 |
| PEI | pbw |  | 10 | 10 | 10 |
| Irgafos 168 | pbw | 0.1 | 0.1 | 0.1 | 0.1 |
| PROPERTIES |  |  |  |  |  |
| IZOD ISO 3 mm RT energy | kJ/m$^2$ | 54 | 27 | 36 | 51 |
| IZOD ISO 3 mm 10° C. energy | kJ/m$^2$ | 55 | 23 | 34 | 50 |
| IZOD ISO 3 mm 0° C. energy | kJ/m$^2$ | 53 | 19 | 31 | 49 |
| IZOD ISO 3 mm −10° C. energy | kJ/m$^2$ | 49 | 18 | 28 | 46 |
| IZOD ISO 3 mm −30° C. energy | kJ/m$^2$ | 40 | 16 | 20 | 41 |
| IZOD ISO 3 mm −50° C. energy | kJ/m$^2$ | 17 | 14 | 18 | 20 |
| IZOD ASTM RT energy | J/m | 719 | 260 | 432 | 628 |
| IZOD ASTM 10° C. energy | J/m | 660 | 225 | 409 | 604 |
| IZOD ASTM 0° C. energy | J/m | 673 | 199 | 389 | 602 |
| IZOD ASTM −10° C. energy | J/m | 663 | 181 | 384 | 578 |
| IZOD ASTM −30° C. energy | J/m | 595 | 169 | 355 | 559 |
| IZOD ASTM −50° C. energy | J/m | 206 | 147 | 262 | 440 |
| Sunscreen, 0.5% strain, 24 hr, YS % | % | 20 | 100 | 100 | 101 |
| Sunscreen, 0.5% strain, 24 hr, EB % | % | 18 | 134 | 87 | 102 |
| Sunscreen, 1% strain, 24 hr, YS % | % | 0 | 21 | 102 | 50 |
| Sunscreen, 1% strain, 24 hr, EB % | % | 0 | 9 | 108 | 39 |
| Sunscreen, 1% strain, 120 hr, YS % | % | NA | NA | 62 | NA |
| Sunscreen, 1% strain, 120 hr, EB % | % | NA | NA | 68 | NA |

The composition containing only PC-Si has good impact properties (CEx1) with high impact energy values at −30° C. at 3 mm ISO testing and at −30° C. ASTM testing. However, this composition has no good performance in ESCR testing with sunscreen, as the property retention of YS % and EB % is poor even at 0.5% strain for 24 hours, with retention below 20% compared to the reference, while at 1% strain, all bars break after 24 hour exposure.

The addition of 10% PEI (CEx2) improves ESCR resistance, as good property retention is achieved at 0.5% strain for 24 hours. At 1% strain for 24 hours, both YS % and EB % is not good, with only 21% and 9% retention respectively. However, as before, the addition of PEI to PC-Si results in significant loss in impact properties and low impact energy values even at room temperature compared to the composition containing only PC-Si.

The addition of compatibilizers to the composition containing PC-Si and 10% PEI, using 5% ITR-PC-Si (Ex3) and 5% PC-Ester1 (Ex4) results in significant improvements in impact properties compared to the composition without compatibilizer (CEx2). PC-Ester1 (Ex4) is more efficient at improving impact properties, and has high energy values at −30° C. at 3 mm ISO testing and at −30° C. ASTM testing, similar to the composition only containing PC-Si (CEx1). ITR-PC-Si also improves impact properties compared to CEx1, but less efficient than PC-Ester1. Both compatibilized compositions also have good retention of YS % and EB % after 24 hours exposure to sunscreen at 0.5%, similar to CEx2. At 1% strain for 24 hours, the property retention is even better than for CEx2, demonstrating that the compatibilizer also has a positive effect on the chemical resistance of these compositions to sunscreen.

With respect to chemical resistance, both ITR-PC-Si (Ex3) and PC-Ester1 (Ex4) improve performance, but ITR-PC-Si is more efficient than PC-Ester 1. At 1% strain for 24 hours, ITR-PC-Si gives good retention of YS and EB, while for PC-Ester1, retention is 50% or less. For ITR-PC-Si, the retention of YS and EB is even rather acceptable after 120 hours at 1% strain with retentions above 60%.

As such, compatibilizer can be chosen to achieve the desired balance of impact properties (better performance for PC-Ester1) and chemical resistance to sunscreen (better performance for ITR-PC-Si). These results demonstrate that the addition of PC-Ester1 or ITR-PC-Si results in a significantly improved balance of impact properties and resistance to exposure to sunscreen.

Examples 5-13

Examples 5-13 compare the impact properties and chemical resistance of compositions containing PC-Si and 25 parts by weight (pbw) of PEI, with and without compatibilizer with different loadings. Formulations and results are shown in Table 4.

TABLE 4

|  |  | CEx5 | CEx6 | Ex7 | Ex8 | Ex9 | Ex10 | Ex11 | Ex12 | Ex13 |
|---|---|---|---|---|---|---|---|---|---|---|
| COMPONENTS |  |  |  |  |  |  |  |  |  |  |
| PC-Si | pbw | 99.9 | 74.9 | 69.9 | 58.2 | 69.9 | 69.9 | 58.2 | 69.9 | 69.9 |
| ITR-PC-Si | pbw |  |  | 5 | 10 | 16.7 |  |  |  |  |
| PC-Ester 1 | pbw |  |  |  |  |  | 5 | 10 | 16.7 | 5 |
| PEI | pbw |  | 25 | 25 | 25 | 25 | 25 | 25 | 25 | 25 |
| Irgafos 168 | pbw | 0.1 | 0.1 | 0.1 | 0.1 | 0.1 | 0.1 | 0.1 | 0.1 | 0.1 |
| TiO$_2$ | pbw |  |  |  |  |  |  |  |  | 12 |
| PROPERTIES |  |  |  |  |  |  |  |  |  |  |
| IZOD ISO 3 mm RT energy | kJ/m$^2$ | 54 | 10 | 17 | 35 | 74 | 45 | 47 | 49 | 35 |
| IZOD ISO 3 mm 10° C. energy | kJ/m$^2$ | 55 | 9 | 16 | 27 | 60 | 43 | 45 | 46 | 32 |
| IZOD ISO 3 mm 0° C. energy | kJ/m$^2$ | 53 | 9 | 16 | 24 | 22 | 40 | 43 | 43 | 29 |
| IZOD ISO 3 mm −10° C. energy | kJ/m$^2$ | 49 | 10 | 16 | 22 | 18 | 36 | 40 | 41 | 26 |
| IZOD ISO 3 mm −30° C. energy | kJ/m$^2$ | 40 | 8 | 14 | 16 | 14 | 25 | 27 | 22 | 18 |
| IZOD ISO 3 mm −50° C. energy | kJ/m$^2$ | 17 | 9 | 13 | 14 | 11 | 18 | 18 | 16 | 15 |
| IZOD ASTM RT energy | J/m | 719 | 96 | 168 | 445 | 740 | 594 | 642 | 681 | 451 |
| IZOD ASTM 10° C. energy | J/m | 660 | 92 | 152 | 290 | 789 | 572 | 596 | 644 | 431 |

TABLE 4-continued

|  |  | CEx5 | CEx6 | Ex7 | Ex8 | Ex9 | Ex10 | Ex11 | Ex12 | Ex13 |
|---|---|---|---|---|---|---|---|---|---|---|
| IZOD ASTM 0° C. energy | J/m | 673 | 91 | 158 | 260 | 372 | 548 | 574 | 590 | 378 |
| IZOD ASTM −10° C. energy | J/m | 663 | 92 | 158 | 225 | 304 | 529 | 547 | 599 | 339 |
| IZOD ASTM −30° C. energy | J/m | 595 | 90 | 153 | 195 | 184 | 443 | 511 | 457 | 257 |
| IZOD ASTM −50° C. energy | J/m | 206 | 92 | 143 | 143 | 125 | 279 | 266 | 196 | 292 |
| Sunscreen, 0.5% strain, 24 hr, YS % | % | 20 | 100 | NA | NA | 99 | 101 | NA | 100 | NA |
| Sunscreen, 0.5% strain, 24 hr, EB % | % | 18 | 97 | NA | NA | 99 | 89 | NA | 85 | NA |
| Sunscreen, 1% strain, 24 hr, YS % | % | 0 | 21 | NA | NA | 103 | 104 | NA | 103 | 99 |
| Sunscreen, 1% strain, 24 hr, EB % | % | 0 | 27 | NA | NA | 100 | 89 | NA | 96 | 113 |
| Sunscreen, 1% strain, 120 hr, YS % | % | NA | NA | NA | NA | 103 | 84 | NA | 104 | 100 |
| Sunscreen, 1% strain, 120 hr, EB % | % | NA | NA | NA | NA | 93 | 60 | NA | 97 | 104 |

The composition containing only PC-Si has good impact properties (CEx5) with high impact energy values at −30° C. at 3 mm ISO testing and at −30° C. ASTM testing. However, this composition has no good performance in ESCR testing with sunscreen, as the property retention of YS % and EB % is poor even at 0.5% strain for 24 hours, with retention below 20% compared to the reference, while at 1% strain, all bars break after 24 hour exposure.

The addition of 25 parts by weight of PEI (CEx6) improves ESCR resistance, as good property retention is achieved at 0.5% strain for 24 hours. At 1% strain for 24 hours, both YS % and EB % is not good, with less than 30% retention. However, as before, the addition of PEI to PC-Si results in significant loss in impact properties and low impact energy values even at room temperature compared to the composition containing only PC-Si.

The addition of compatibilizers to the composition containing PC-Si and 25% PEI, using ITR-PC-Si (Ex7-9) and PC-Ester1 (Ex10-12) results in significant improvements in impact properties compared to the composition without compatibilizer (CEx6). PC-Ester1 (Ex4) is more efficient at improving impact properties, and has high energy values at −10° C. at 3 mm ISO testing and at −30° C. ASTM testing, at any loading between 5 pbw (Ex10) and 16.7 pbw (Ex12). ITR-PC-Si also improves impact properties compared to CEx6, but less efficient than PC-Ester1, as 5 pbw (Ex7) is not sufficient to achieve high energy values in ISO or ASTM testing at room temperature, and the low temperature impact at 10 pbw and 16.7 pbw loading (Ex8 and 9) is lower than in the case of using PC-Ester 1 (Ex10-12).

Compositions containing Si-PC, 25 pbw of PEI and 16.7 pbw of ITR-PC-Si (Ex9), 5 pbw of PC-Ester1 (Ex10) and 16.7 pbw of PC-Ester1 (Ex12) all have excellent YS and EB retention after 24 hr exposure at 0.5% and 1% strain. This is significantly better performance than for the composition without compatibilizer (CEx6), showing that the compatibilizer also has a positive effect on the chemical resistance of these compositions to sunscreen. The two compositions containing 16.7 pbw of ITR-PC-Si (Ex9) and PC-Ester1 (Ex12) also have excellent property retention after 120 hours at 1% strain, whereas the composition with 5 pbw of PC-Ester does lose some EB (60% retention) and YS (84% retention).

As such, compatibilizer content can be optimized to achieve the desired balance of impact properties and chemical resistance to sunscreen, which at 25 pbw of PEI, even allows excellent retention after 120 hours exposure at 1% strain, which cannot be achieved by compositions containing PC-Si or PC-Si and 25 pbw of PEI.

The addition of TiO$_2$ (Ex13) decreases the impact properties of the compatibilized composition somewhat compared to Ex35, but still good impact energy levels at low temperatures are achieved. The TiO$_2$ has a positive effect on the chemical resistance, as it allows excellent YS and EB retention after 120 hours at 1% strain, whereas the composition without TiO$_2$ had lower retention (Ex10).

These results demonstrate that the addition of PC-Ester1 or ITR-PC-Si results in a significantly improved balance of impact properties and resistance to exposure to sunscreen.

Examples 14-18

Examples 14-18 compare the impact properties and chemical resistance of compositions containing PC-Si and PEI, with and without compatibilizer with different loadings. Formulations and results are shown in Table 5.

TABLE 5

|  |  | CEx14 | Ex15 | Ex16 | Ex17 | Ex18 |
|---|---|---|---|---|---|---|
| COMPONENTS |  |  |  |  |  |  |
| PC-Si | pbw | 59.9 | 54.9 | 49.9 | 54.9 | 54.9 |
| PC-Ester 1 | pbw |  | 5 | 10 | 5 | 5 |
| PEI | pbw | 40 | 40 | 40 | 40 | 40 |
| Irgafos 168 | pbw | 0.1 | 0.1 | 0.1 | 0.1 | 0.1 |
| TiO$_2$ |  |  |  |  | 6* | 12* |
| PROPERTIES |  |  |  |  |  |  |
| IZOD ISO 3 mm RT energy | kJ/m$^2$ | 10 | 20 | 12 | 30 | 42 |
| IZOD ISO 3 mm 10° C. energy | kJ/m$^2$ | 10 | 26 | 11 | 31 | 32 |
| IZOD ISO 3 mm 0° C. energy | kJ/m$^2$ | 10 | 13 | 12 | 14 | 18 |
| IZOD ISO 3 mm −10° C. energy | kJ/m$^2$ | 10 | 13 | 11 | 12 | 12 |
| IZOD ISO 3 mm −30° C. energy | kJ/m$^2$ | 9 | 10 | 11 | 10 | 11 |
| IZOD ISO 3 mm −50° C. energy | kJ/m$^2$ | 8 | 10 | 8 | 9 | 10 |
| IZOD ASTM RT energy | J/m | 89 | 694 | 757 | 702 | 564 |
| IZOD ASTM 10° C. energy | J/m | 94 | 577 | 337 | 531 | 288 |
| IZOD ASTM 0° C. energy | J/m | 84 | 157 | 145 | 178 | 164 |

TABLE 5-continued

|  | | CEx14 | Ex15 | Ex16 | Ex17 | Ex18 |
|---|---|---|---|---|---|---|
| IZOD ASTM −10° C. energy | J/m | 86 | 129 | 115 | 149 | 149 |
| IZOD ASTM −30° C. energy | J/m | 81 | 131 | 106 | 119 | 137 |
| IZOD ASTM −50° C. energy | J/m | 85 | 89 | 80 | 96 | 102 |
| Sunscreen, 0.5% strain, 24 hr, YS % | % | NA | NA | NA | NA | NA |
| Sunscreen, 0.5% strain, 24 hr, EB % | % | NA | NA | NA | NA | NA |
| Sunscreen, 1% strain, 24 hr, YS % | % | 100 | 100 | 99 | 100 | 99 |
| Sunscreen, 1% strain, 24 hr, EB % | % | 79 | 99 | 88 | 112 | 90 |
| Sunscreen, 1% strain, 120 hr, YS % | % | 99 | 100 | 99 | 98 | 99 |
| Sunscreen, 1% strain, 120 hr, EB % | % | 102 | 100 | 99 | 102 | 82 |

*The amount of $TiO_2$ is weight percent based on the total weight of the PC-Si, PC-Ester 1, and PEI.

The composition containing PC-Si and 40% PEI (CEx14) has good ESCR resistance, as good property retention is achieved at 1% strain for 24 or 120 hours. However, as before, the addition of PEI to PC-Si results in significant loss in impact properties and low impact energy values even at room temperature.

The addition of 5% (Ex15) or 10% (Ex16) PC-Ester 1 as compatibilizer to the composition containing PC-Si and 40% PEI, results in significant improvements in impact properties compared to the composition without compatibilizer (CEx14), mainly in ASTM impact, achieving significantly higher impact energy values compared to CEx14 over the whole temperature range, and high energy values as low as 10'C. Both compositions have similar ESCR resistance as CEx14, as good property retention is achieved at 1% strain for 24 or 120 hours, but now with significantly improved impact properties.

These results demonstrate that the addition of PC-Ester1 or ITR-PC-Si results in a significantly improved balance of impact properties and resistance to exposure to sunscreen.

The addition of 6% (Ex17) or 12% (Ex18) TiO2 surprisingly improves ISO impact properties, and does not affect or slightly decreases ASTM impact. At these loadings, still good ESCR resistance is achieved with good property retention at 1% strain for 24 or 120 hours. As such, TiO2 can be added, for instance to achieve certain light colors.

Comparative Examples 27-28

Comparative examples 27-28 illustrates the effect of $TiO_2$ selection on the colorability of compositions containing PEI, PC-Si, and a phosphite stabilizer. Formulations and results are shown in Table 7.

TABLE 7

|  |  | CEx 27 | CEx 28 |
|---|---|---|---|
| COMPONENTS | | | |
| PEI | pbw | 39.9 | 39.9 |
| PC-Si | pbw | 60.0 | 60.0 |
| Phosphite Stabilizer | pbw | 0.1 | 0.1 |
| $TiO_2$ (uncoated) | pbw | 20.0 | |
| $TiO_2$ (coated) | pbw | | 20.0 |
| PROPERTIES | | | |
| Mechanical | | | |
| Flex Modulus | | 2660 | 2450 |
| Flex Strength, Y ld | MPa | 104 | 101 |
| HDT, 1.82 MPa | | 131 | 132 |
| IZOD-Notched | J/m | 75 | 97 |
| Ductility | % | 0 | 0 |
| IZOD-Reversed Notched | J/m | 2100 | 2020 |
| Ductility | % | 50 | 80 |
| Tensile Modulus | | 2676 | 2404 |

TABLE 7-continued

|  |  | CEx 27 | CEx 28 |
|---|---|---|---|
| Tensile Strength, Yld | | 56 | 54 |
| Tensile Elongation, Bk | | 20.8 | 22.1 |
| Rheology | | | |
| Mdens | | 1.24 | 1.27 |
| MVR | cm³/10 min | 21.3 | 19.8 |
| MFR −295° C., 6.7 kg | | 26.4 | 25.1 |
| Superwhite Colorability* | | | |
| DL* | | 0.7 | 4.5 |

Superwhite colorability means L* >93.

The results indicate that at the same loading level, coated $TiO_2$ provides better colorability to a composition containing 39.9% of PEI, 0.1% of phosphite stabilizer, and 60% of PC-Si as compared to uncoated $TiO_2$.

Examples 29-30

Examples 29-31 show the mechanical, rheology, and colorability properties of various compositions containing PEI, PC-Si, and ITR-PC-Si. Formulations and results are shown in Table 8.

TABLE 8

|  |  | Ex 29 | Ex 30 |
|---|---|---|---|
| COMPONENTS | | | |
| PEI | pbw | 10 | 10 |
| PEI-Si | pbw | | 0.02 |
| PC-Si | pbw | 89.9 | 89.9 |
| ITR-PC-Si | pbw | 20 | 19.9 |
| PROPERTIES | | | |
| TS@Yld | MPa | 54 | 54 |
| El@Yld | | 5.1 | 5.2 |
| El@Bk | % | 90.6 | 90.4 |
| MVR | cm³/10 min | 46.5 | 46.6 |
| MV@ 300° C. | Pa.s | 389 | 389 |
| IZOD-N | J/m | 476 | 471 |
| DL* | | 5.1 | 5.1 |

All formulations contain 10 pph $TiO_2$ (coated).

The results indicate that the compositions containing 10 pbw of PEI, 89.9 pbw of PC-Si and about 20 pbw of ITR-PC-Si have high flow and good impact properties. The compositions also have superwhite colorability with L*>93.

Examples 32-34

Examples 32-34 show the mechanical, rheology, and colorability properties of various compositions containing PEI, PC-Si, and ITR-PC-Si. Formulations and results are shown in Table 9.

TABLE 9

|  |  | Ex 32 | Ex 33 | Ex 34 |
|---|---|---|---|---|
| COMPONENTS |  |  |  |  |
| PEI | pbw | 31.7 | 32.6 | 31.1 |
| PC-Si | pbw | 51.5 | 50.7 | 52.6 |
| ITR-PC-Si | pbw | 16.7 | 16.7 | 16.4 |
| PROPERTIES |  |  |  |  |
| TS@YId | MPa | 65 | 66 | 65 |
| El@YId |  | 6.0 | 6.0 | 5.9 |
| El@Bk | % | 79.4 | 81.0 | 78.5 |
| MVR | cm³/10 min | 26.0 | 25.5 | 26.5 |
| IZOD-N | J/m | 781 | 742 | 758 |
| DL* |  | 4.4 | 4.4 | 4.4 |

All formulations contain 10 pph TiO$_2$ (coated).

The results indicate that the compositions containing about 30% of PEI, about 50% of PC-Si, and about 20% of FST have excellent impact, good chemical resistance, and good flow properties. These compositions also have super white colorability with L*>93.

Examples 35-38

Examples 35-38 show the mechanical, rheology, and colorability properties of various compositions containing PEI, PC-Si, and ITR-PC-Si. Formulations, processing conditions, and results are shown in Table 10.

TABLE 10

|  |  | Ex 35 | Ex 36 | Ex 37 | Ex 38 |
|---|---|---|---|---|---|
| COMPONENTS |  |  |  |  |  |
| PEI | pbw | 10 | 10 | 10 | 30 |
| PC-Si | pbw | 90 | 90 | 90 | 70 |
| ITR-PC-Si | pbw | 20 | 5 | 20 | 20 |
| TiO$_2$ (coated) | pbw |  | 10 | 10 | 10 |
| Phosphite stabilizer | pbw | 0.10 | 0.10 | 0.10 | 0.10 |
| Processing Conditions |  |  |  |  |  |
| Extrusion |  |  |  |  |  |
| Die Set Temp (F.) |  | 550 | 550 | 550 | 560 |
| Screw Speed (rpm) |  | 300 | 300 | 300 | 300 |
| injection Molding |  |  |  |  |  |
| Barrel Set Temp (F.) |  | 560 | 560 | 560 | 570 |
| Mold Set Temp (F.) |  | 220 | 220 | 220 | 220 |
| Inject Speed (in/s) |  | 1 | 1 | 1 | 1 |
| PROPERTIES |  |  |  |  |  |
| Tensile Strength, YId | MPa | 58 | 53 | 55 | 61 |
| Elongation @ Bk | % | 110 | 92 | 91 | 93 |
| Izod-N | J/m | 685 | 424 | 543 | 849 |
| Ductility | % | 100 | 100 | 100 | 100 |
| Izod-R | J/m | 2130 | 2130 | 2130 | 2130 |
| Ductility | % | 100 | 100 | 100 | 100 |
| Color |  | natural | white | white | white |
| DL* |  |  | 4.711 | 4.767 | 4.046 |
| MVR (295° C., 6.6 Kg) | cm³/10 min | 29 | 26 | 26 | 27 |
| MV_M @ 300° C., 640 s$^{-1}$ | Pa · s | 414 | 402 | 399 | 567 |
| Rhe_M@310° C., 30 min | % | −12 | 4 | −11 | 6 |

These compositions have excellent impact strength achieving Izod-N of 685 J/m, 424 J/m, 543 J/m, and 849 J/m respectively (Ex35-Ex38) despite the high $TiO_2$ loading.

Examples 39-49

These examples show the properties of compositions containing PEI, PC-Si, PC-ITR-Si with or without PEI-Si. Formulations and results are shown in Table 11.

TABLE 11

|  |  | Ex39 | Ex40 | Ex41 | Ex42 | Ex43 | Ex44 | Ex45 | Ex46 | Ex47 | Ex48 | Ex49 |
|---|---|---|---|---|---|---|---|---|---|---|---|---|
| COMPONENTS |  |  |  |  |  |  |  |  |  |  |  |  |
| PEI | pbw | 10 | 10 | 10 | 10 | 10 | 10 | 20 | 30 | 30 | 30 | 30 |
| PEI-Si | pbw | 10 |  |  | 5 |  |  |  |  | 10 | 5 |  |
| PC-Si | pbw | 90 | 90 | 90 | 90 | 90 | 90 | 80 | 70 | 70 | 70 | 70 |
| FST | pbw | 20 | 5 | 20 | 20 | 12.5 | 5 | 20 | 12.5 | 20 | 20 | 20 |
| PROPERTIES |  |  |  |  |  |  |  |  |  |  |  |  |
| El@Bk | % | 51 | 100 | 78 | 70 | 91 | 92 | 78 | 57 | 45 | 50 | 89 |
| Izod-N | J/m | 221 | 397 | 470 | 191 | 392 | 397 | 546 | 319 | 338 | 267 | 850 |
| Ductility | % | 100 | 100 | 100 | 100 | 100 | 100 | 100 | 90 | 100 | 100 | 100 |
| dL |  | −1.0 | −1.0 | −1.1 | −1.1 | −1.1 | −1.0 | −1.7 | −1.9 | −1.6 | −1.8 | −1.9 |

All formulations contain 10 pph $TiO_2$ (coated).

Examples 50-61

These examples illustrate the effect of different UV stabilizers on the UV stability of compositions containing PEI, PC-Si, and ITR-PC-Si. Formulations and results are shown in Table 12.

TABLE 12

| Components |  | Ex50 | Ex51 | Ex52 | Ex53 | CEx54 | Ex55 | Ex56 | Ex57 | Ex58 | Ex59 | Ex60 | Ex61 |
|---|---|---|---|---|---|---|---|---|---|---|---|---|---|
| PEI | pbw | 10 | 10 | 20 | 20 | 30 | 30 | 30 | 30 | 30 | 30 | 30 | 30 |
| PC-Si | pbw | 90 | 90 | 80 | 80 | 70 | 70 | 70 | 70 | 70 | 70 | 70 | 70 |
| ITR-PC-Si | pbw | 5 | 5 | 20 | 20 |  | 20 | 20 | 20 | 20 | 20 | 20 | 20 |
| UVS* 1 | pbw | 2.2 | 4.4 | 2.5 | 5.0 |  | 2.5 | 5.0 |  |  |  |  |  |
| UVS* 2 | pbw |  |  |  |  |  |  |  | 1.25 | 2.5 | 0.6 |  |  |
| UVS* 3 | pbw |  |  |  |  |  |  |  |  |  | 1.8 |  |  |
| UVS* 4 | pbw |  |  |  |  |  |  |  |  |  |  | 1.25 | 2.5 |
| Phosphite** | % | 0.1 | 0.1 | 0.1 | 0.1 | 0.1 | 0.1 | 0.1 | 0.1 | 0.1 | 0.1 | 0.1 | 0.1 |
| Color |  | white | white | white | white | white | white | white | white | white | white | white | white |
| Residual UV by HPLC |  | 1.63% | 3.17% | 1.89% | 3.68% |  | 1.99% | 3.83% | 0.97% | 2.46% | 0.70% | 1.13% | 2.07% |
| UV dE after 100 hrs |  | 2.2 | 1.4 | 3.4 | 2.1 |  | 4.0 | 2.6 | 5.5 | 4.5 | — | 4.6 | 4.0 |
| UV dE after 200 hrs |  | 3.2 | 2.2 | 5.0 | 3.4 |  | 5.6 | 4.1 | 7.1 | 6.0 | — | 6.3 | 5.1 |
| UV dE after 300 hrs |  | 3.6 | 2.6 | 6.0 | 4.4 |  | 6.7 | 5.1 | 8.1 | 7.2 | — | 7.4 | 6.2 |
| IZOD-Notched | J/m | 232 | 176 | 143 | 106 | 84 | 155 | 106 | 593 | 220 | 42 | 850 | 238 |
| Ductility | % | 0 | 0 | 0 | 0 | 0 | 0 | 0 | 100 | 0 | 0 | 100 | 0 |
| IZOD-Rev. Notched | J/m | 2130 | 2000 | 2130 | 2090 | 2050 | 2130 | 2020 | 2130 | 2130 | 730 | 2130 | 2130 |
| Ductility | % | 90 | 67 | 100 | 90 | 70 | 100 | 60 | 100 | 100 | 0 | 100 | 100 |
| Elong. at Bk | % | 22 | 20 | 38 | 19 | 16 | 47 | 26 | 66 | 85 | 7 | 90 | 81 |

All formulations contain 10 pph $TiO_2$ (coated).

*UV Stabilizer

**Phosphite Stabilizer

Examples 62-72

These examples illustrate the effect of different UV stabilizers on the UV stability of compositions containing PEI, PC-Si, and ITR-PC-Si. Formulations and results are shown in Table 13.

TABLE 13

| COMPONENTS | | Ex62 | Ex63 | Ex64 | Ex65 | Ex66 | Ex67 | Ex68 | Ex69 | Ex70 | Ex71 | Ex72 |
|---|---|---|---|---|---|---|---|---|---|---|---|---|
| PEI | pbw | 10 | 10 | 10 | 10 | 10 | 10 | 30 | 30 | 30 | 30 | 30 |
| PC-Si | pbw | 90 | 90 | 90 | 90 | 90 | 90 | 70 | 70 | 70 | 70 | 70 |
| ITR-PC-Si | pbw | 5 | 5 | 5 | 5 | 5 | 5 | 20 | 20 | 20 | 20 | 20 |
| UV Stabilizer 5 | pbw | | 2.2 | 4.4 | | | 2.5 | 2.5 | 5.0 | | | |
| UV Stabilizer 6 | pbw | | | | 4.4 | | | | | 5.0 | | |
| UV Stabilizer 4* | pbw | | | | | 4.4 | | | | | 5.0 | |
| UV Stabilizer 2 | pbw | | | | | | 4.4 | | | | | |
| Phosphite Stabilizer | pbw | 0.1 | 0.1 | 0.1 | 0.1 | 0.1 | 0.1 | 0.1 | 0.1 | 0.1 | 0.1 | 0.1 |
| Color | | white | white | white | white | white | white | white | white | white | white | white |
| Residual UV by HPLC | | nd | 2.02% | 3.64% | 2.99% | 2.55% | 1.97% | 10.30% | 4.52% | 2.87% | * | nd |
| UV dE after 100 hrs | | — | — | — | — | — | — | — | — | — | — | — |
| UV dE after 200 hrs | | — | — | — | — | — | — | — | — | — | — | — |
| UV dE after 300 hrs | | 5.6 | 4.3 | 3.1 | 3.2 | 3.0 | 3.7 | 7.7 | 6.1 | 5.5 | 5.5 | 9.9 |
| IZOD-Notched | J/m | 424 | 287 | 220 | 193 | 268 | 251 | 152 | 115 | 148 | 177 | 850 |
| Ductility | % | 100 | 0 | 0 | 0 | 0 | 0 | 0 | 0 | 0 | 0 | 100 |
| IZOD-Rev. Notched | J/m | 2130 | 2130 | 2060 | 2130 | 2130 | 2080 | 2050 | 2130 | 2130 | 2130 | 2130 |
| Ductility | % | 100 | 100 | 90 | 100 | 100 | 90 | 90 | 100 | 100 | 100 | 100 |
| Elongation @ Bk | % | 92 | 55 | 26 | 30 | 54 | 18 | 16 | 18 | 84 | 81 | 93 |

All formulations contain 10 pph TiO2 (coated)
*UV stabilizer 4 = 2.66% and UV stabilizer 2 = 1.92%

As shown in examples 62-72, compositions containing PEI, PC-Si, ITR-PC-Si can achieve a super white colorability (L*>93), a notched Izod impact of 400 or 800 J/m, a 100% ductility, a tensile elongation at Bk of 90% or 100%, an MVR at 295° C. and 6.6 kg of about 40 or about 70 $cm^3/10$ min, and an UV dE after 300 hours of 3.0 or 5.0 (db*>5). The percent of pigment needed is 1×.

Examples 73-89

These examples show the ductility and impact of compositions containing PEI, PC-Si, and ITR-PC-Si with or without the presence of PEI-Si. Formulations and results are shown in Table 14. Scanning electron microscopic images of examples 73, 74, 77, 78, 81, 82, 83, 87, and 89 are shown in FIGS. 1-13.

TABLE 14

| Example No. | Parts of PEI/PC-Si/PEI-Si/ITR-PC-Si | % Ductility/ N-Impact | Form |
|---|---|---|---|
| Ex 73 | 10/90/0/5 | 100/397 | Pellet |
| Ex 74 | 10/90/5/5 | 0/151 | Pellet |
| Ex 75 | 10/90/0/20 | 100/470 | Pellet |
| Ex 76 | 10/90/0/20 | 100/685 | Pellet |
| Ex 77 | 10/90/0/20 | 100/685 | Part |
| Ex 78 | 20/80/0/5 | 0/165 | Pellet |
| Ex 79 | 20/80/10/5 | 0/81 | Pellet |
| Ex 80 | 20/80/10/20 | 100/230 | Pellet |
| Ex 81 | 20/80/0/20 | 100/546 | Pellet |
| Ex 82 | 30/70/0/5 | 0/128 | Pellet |
| Ex 83 | 30/70/0/20 | 100/850 | Pellet |
| Ex 84 | 30/70/0/12.5 | 90/319 | Pellet |
| Ex 85 | 30/70/5/12.5 | 100/116 | Pellet |
| Ex 86 | 30/70/5/20 | 100/267 | Pellet |
| Ex 87 | 30/70/0/20 | 100/849 | Part |
| Ex 88 | 50/50/0/5 | 0/130 | Pellet |
| Ex 89 | 50/50/2/20 | 0/158 | Pellet |

All formulations contain 10 pph TiO₂ (coated).

Examples 90-93

Table 15 shows exemplary CTI and electrical data for compatibilized (Ex. 90, 91) and a Comparative formulation (CEx92).

TABLE 15

| Components (pbw) | | Ex 90 | Ex 91 | CEx 92 |
|---|---|---|---|---|
| PEI | | 10.0 | 25.0 | 33.0 |
| PC-Si | | 84.9 | 58.0 | |
| ITR-PC-Si | | 5.0 | 16.9 | |
| Phosphite Stabilizer | | 0.1 | 0.1 | 0.1 |
| PEI-Si | | | | 5.8 |
| PCP 1300 | | | | 2.9 |
| 100 grade PCP | | | | 54.6 |
| UV Stabilizer 1 | | | | 0.1 |
| UV stabilizer 7 | | | | 4.0 |
| Total (pbw) | | 100. | 100. | 100 |
| Test Voltage | | # of drops to crack-Avg | | |
| 225 | | 22.00 | 19.80 | 21.20 |
| 200 | | 40.60 | 31.60 | 35.80 |
| 175 | | 100.00 | 100.00 | 100.00 |
| 150 | | 100.00 | 100.00 | 100.00 |
| DK | 100 MHZ | 2.8 | 2.88 | 2.86 |
| DF | 100 Mz | 0.052 | 0.05 | 0.044 |
| Dk | 500 MHZ | 2.78 | 2.86 | 2.84 |
| Df | 500 MHz | 0.028 | 0.032 | 0.028 |
| Dk | 1 GHz | 2.77 | 2.84 | 2.83 |

TABLE 15-continued

| Components (pbw) | | Ex 90 | Ex 91 | CEx 92 |
|---|---|---|---|---|
| Df | 1 GHz | 0.04 | 0.03 | 0.03 |
| Dk 100 KHz | ASTM D-150 | | | 2.94 |
| Df | | | | |
| Ds V/mm | ASTM D-149 | 20671 | 24886 | 24700 |
| DS DC estimate | | 575.09651 | 631.0119 | 628.6493 |
| Arc Resistance (sec) | ASTM D-495 | 33 | 47 | 61 |

Tables 16 shows exemplary color data for a compatibilized formulation.

TABLE 16

| Components | | | | Ex93 | | |
|---|---|---|---|---|---|---|
| PEI (pbw) | | | | 10 | | |
| PC-Si (pbw) | | | | 84.9 | | |
| ITR-PC-Si (pbw) | | | | 5 | | |
| Phosphite Stabilizer (PPH) | | | | 0.10 | | |
| Titania (coated)* (PPH) | | | | 5.5 | | |
| Solvent Red* (PPH) | | | | 0.00205 | | |
| Solvent Violet* (PPH) | | | | 0.00952 | | |
| L* | a* | b* | dL* | da* | db* | DE |
| 93.11 | −0.64 | −0.55 | | | | |
| 93.59 | −0.82 | −0.68 | 0.2 | 0.18 | −0.12 | 0.3 |

*PPH, based on parts by weight of the first four listed components

Examples 94-97

Figure 14:
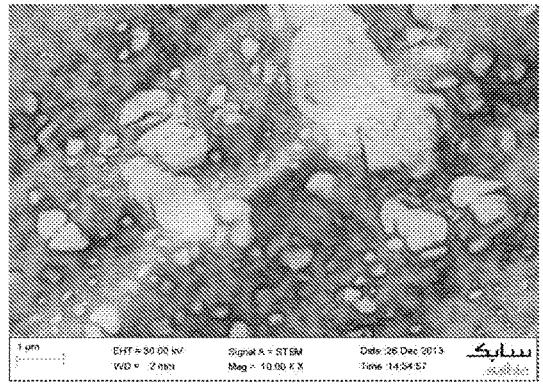
FIG. 14 shows a scanning electron microscopic ("SEM") image of a sample of example 90.

Example 94, containing 33 wt. % of PEI, 9 wt. % of PEI-Si, and 58 wt. % of PC (0% $TiO_2$), was cryo-microtomed and stained with $RuO_4$ for 4 minutes. The stained sample was then imaged using a Zeiss Supra 40VP scanning electron microscope ("SEM") with scanning transmission electron microscope (STEM) module at HV, 30 kv, and 21 pA. The image obtained is in FIG. 14. The phase size was 5 microns.

Figure 15:
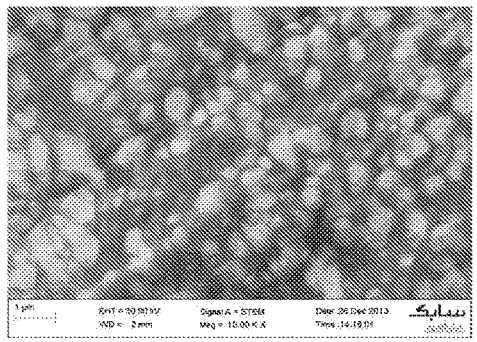
FIG. 15 shows a scanning electron microscopic ("SEM") image of a sample of example 91.

Example 95, A sample containing 25 wt. % PEI, 17 wt. % ITR-PC, and 58 wt. % of PC-Si (0% $TiO_2$), was cryo-microtomed and stained with $RuO_4$ for 4 minutes. The stained sample was then imaged using a Zeiss Supra 40VP scanning electron microscope ("SEM") with scanning transmission electron microscope (STEM) module at HV, 30 kv, and 21 pA. The image obtained is shown in FIG. 15. The phase size was about 1 micron.

Figure 16:
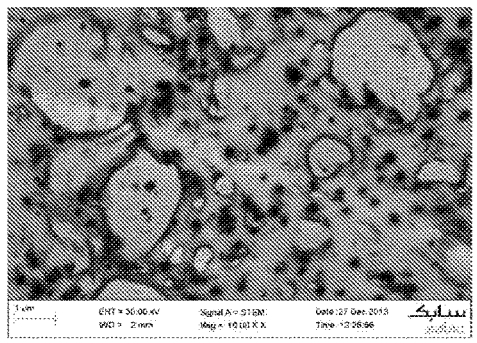
FIG. 16 shows a scanning electron microscopic ("SEM") image of a sample of example 92.

Example 96, containing 29 wt. % of PEI, 8 wt. % of PEI-Si, 51 wt. % of PC, and 12 wt. % of $TiO_2$, was cryo-microtomed and stained with $RuO_4$ for 4 minutes. The stained sample was then imaged using a Zeiss Supra 40VP scanning electron microscope ("SEM") with scanning transmission electron microscope (STEM) module at HV, 30 kv, and 21 pA. The image obtained is shown in FIG. 16. The phase size was about 5 microns.

Figure 17:
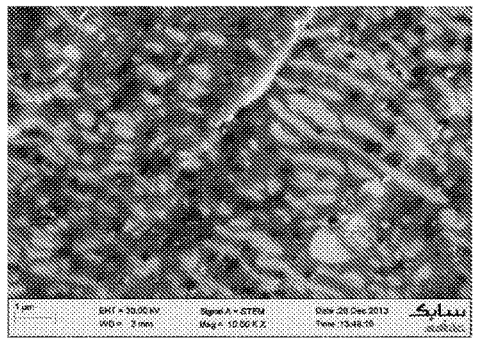
FIG. 17 shows a scanning electron microscopic ("SEM") image of a sample of example 93.

Example 97, containing 22 wt. % of PEI, 15 wt. % of ITR-PC, 51 wt. % of Si-PC, and 12 wt. % of $TiO_2$, was cryo-microtomed and stained with $RuO_4$ for 4 minutes. The stained sample was then imaged using a Zeiss Supra 40VP scanning electron microscope ("SEM") with scanning transmission electron microscope (STEM) module at HV, 30 kv, and 21 pA. The image obtained is shown in FIG. 17. The phase size was about 1 micron.

Set forth below are some embodiments of the thermoplastic compositions, methods of manufacture and articles comprising the same.

In an embodiment, a thermoplastic composition comprises, based on the total weight of the thermoplastic composition, 10 to 45 wt. % of a poly(etherimide); 35 to 90 wt. % of a poly(carbonate-siloxane); 0.5 to 20 wt. % of compatibilizer polycarbonate component comprising a poly(carbonate-arylate ester); up to 15 wt. % or up to 5 wt. % of an ultraviolet light stabilizer; and 0 to 30 wt. % or 0 to 20 wt. % of $TiO_2$; wherein a sample of the composition has a notched Izod impact energy of at least 200 J/m or at least 250 J/m or at least 400 J/m at 23° C. measured in accordance to ASTM D256; an at least 50% higher notched Izod impact energy value compared to the composition without the compatibilizer component measured in accordance to ASTM D256.

In another embodiment, a thermoplastic composition comprises, based on the weight of the composition: 20 to 35 wt. % of a poly(etherimide); 50 to 75 wt. % of a poly(carbonate-siloxane); and 5 to 35 wt. % of compatibilizer polycarbonate component comprising a poly(carbonate-arylate ester); and 0 to 15 wt. % or 0 to 8 wt. % of an ultraviolet light stabilizer; and 0 to 30 wt. % or 0 to 20 wt. % of titanium dioxide; and wherein a sample of the composition has a notched Izod impact energy value greater than 300 J/m at room temperature compared to the composition without the compatibilizer component measured in accordance to ASTM D256; and wherein a sample of the composition has a poly(etherimide) domain size in at least one dimension equal to or lower than 1 micron as measured by STEM.

For any of the foregoing thermoplastic compositions, one or more of the following can apply: (a) the polyetherimide of the thermoplastic compositions comprises units of the formula (1); (b) the compositions further comprise 0.5 to 10 wt. % of a poly(etherimide-siloxane) copolymer; (c) the poly(carbonate-siloxane) comprises first repeating units and second repeating units, wherein the first repeating units are bisphenol carbonate units of the formula (6) and the second repeating units are polysiloxane units of the formula (9), (9a), (9a-1), (9a-2), (9b), (9b-1), (9b-2), (9b-3), or (9b-4), or a combination comprising at least one of the foregoing, preferably (9b-2), (9b-3), (9b-4) or a combination comprising at least one of the foregoing; (d) the poly(carbonate-arylate ester) comprises bisphenol A carbonate units and arylate ester units of the formula (10a); (e) the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45 or the poly(carbonate-arylate ester) is a poly(bisphenol A carbonate)-co-(bisphenol phthalate ester) comprising 75 to 85 wt. % of the ester units, wherein the ester units have a molar ratio of isophthalate to terephthalate of 98:2 to 88:12; (f) the poly(carbonate-arylate ester) comprises bisphenol A carbonate units, arylate ester units of the formula (10b), optionally, monoaryl carbonate units of the formula (12), and optionally, bisphenol ester units of the formula (10a) wherein; (g) the poly(carbonate-arylate ester) comprises 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof; (h) the poly(carbonate-arylate ester) comprises 1 to 20 mol % of bisphenol A carbonate units, 60 to 99 mol % of isophthalic acid-terephthalic acid-resorcinol ester units, and optionally, 1 to 20 mol % resorcinol carbonate units, isophthalic acid-terephthalic acid-bisphenol A ester units, or a combination thereof; (i) the poly(carbonate-arylate ester) is a poly(carbonate-monoaryl arylate ester) further comprising siloxane groups comprising repeating carbonate units of the formula (6), arylate ester units of the formula (10b), polysiloxane units of the formula (9), (9a), (9a-1), (9a-2), (9b), (9b-1), (9b-2), (9b-3), or (9b-4), or a combination comprising at least one of the foregoing, preferably (9b-2), (9b-3), (9b-4) or a combination comprising at least one of the foregoing; or (j) the poly(carbonate-arylate ester) comprises 1 to 40 mol % of the bisphenol A carbonate units, 50 to 95 mol % of isophthalic acid-terephthalic acid-resorcinol units, and the siloxane units in an amount effective to provide 0.1 to 10 wt % of siloxane units, based on the weight of the poly(carbonate-ester-siloxane), wherein optionally the siloxane units are of formulas (9b-2), (9b-3), (9b-4) or a combination comprising at least one of the foregoing, wherein E has an average value of 2 to 90, and the siloxane units are present in an amount effective to provide 0.5% to 7% dimethylsiloxane units based on the weight of the composition.

The foregoing compositions can have properties as follows: (a) the compositions have a yield stress retention of 80% and higher after exposure of an ISO tensile bar for 24 hours to sunscreen (such as Banana Boat®) under 0.5% strain or under 1% strain compared to a non-exposed reference tested according to ISO 527 and an elongation at break retention of 75% and higher after exposure of an ISO tensile bar for 24 hours to sunscreen (such as Banana Boat®) under 0.5% strain or under 1% strain compared to a non-exposed reference tested according to ISO 527; (b) the compositions have a polyetherimide content of 20 to 45 wt % having a yield stress retention of 80% and higher after exposure of an ISO tensile bar for 120 hours to sunscreen (such as Banana Boat®) under 0.5% strain or under 1% strain compared to a non-exposed reference tested according to ISO 527 and an elongation at break retention of 75% and higher after exposure of an ISO tensile bar for 120 hours to sunscreen (such as Banana Boat®) under 0.5% strain or under 1% strain compared to a non-exposed reference tested according to ISO 527; or (c) the composition has an Izod notched impact energy of at least 200 J/m or at least 250 J/m or at least 400 J/m measured at +10° C., at −10° C., at −30° C., at −50° C. according to ASTM D256; (d) the composition has an Izod notched impact energy of at least 35 kJ/m$^2$ measured at +23° C., at +10° C., at −10° C. according to ISO 180 on 3 mm thick ISO impact bars; or (u) the composition has an Izod notched impact energy of at least 30 kJ/m$^2$ measured at −30° C., at −50° C. according to ISO 180 on 3 mm thick ISO impact bars.

As a specific example, a composition comprises, based on the weight of the composition: 10 to 30 wt. % of a polyetherimide; 30 to 89 wt. % of a poly(carbonate-siloxane); 0.5 to 20 wt. % of a poly(carbonate-arylate ester); and up to 15 wt. % or up to 10 wt. % or up to 5 wt. % of an ultraviolet light stabilizer; and 0 to 30 wt. % or 0 to 20 wt. % of TiO$_2$, wherein the poly(carbonate-siloxane) comprises bisphenol A carbonate units, and siloxane units of the formula (9b-2), (9b-3), (9b-4) or a combination comprising at least one of the foregoing, wherein the poly(carbonate-arylate ester) comprises 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof, and wherein a sample of the composition has a Notched Izod impact of greater than or equal to 500 J/m, measured at +23° C., optionally +10° C., at −10° C., or at −30° C., according to ASTM D256 and a yield stress retention of 80% and higher after exposure of an ISO tensile bar for 24 hours to sunscreen (such as Banana Boat®) under 1% strain compared to a non-exposed reference tested according to ISO 527 and an elongation at break retention of 75% and higher after exposure of an ISO tensile bar for 24 hours to sunscreen (such as Banana Boat®) under 1% strain compared to a non-exposed reference tested according to ISO 527.

As another example, a composition comprises, based on the weight of the composition: 30 to 45 wt. % of a polyetherimide; 15 to 69 wt. % of a poly(carbonate-siloxane); 0.5 to 20 wt. % of a poly(carbonate-arylate ester); up to 15 wt. % or up to 10 wt. % or up to 5 wt. % of an ultraviolet light stabilizer; 0 to 30 wt. % or 0 to 20 wt. % of TiO$_2$, wherein the poly(carbonate-siloxane) comprises bisphenol A carbonate units, and siloxane units of the formula (9b-2), (9b-3), (9b-4) or a combination comprising at least one of the foregoing, wherein the poly(carbonate-siloxane) comprises 0.5 to 55 wt. % of siloxane units based on the total weight of the poly(carbonate-siloxane), wherein the poly(carbonate-arylate ester) comprises 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof, and wherein a sample of the composition has a Notched Izod impact of greater than or equal to 500 J/m, measured at +23° C., according to ASTM D256 and a yield stress retention of 80% and higher after exposure of an ISO tensile bar for 120 hours to sunscreen (such as Banana Boat®) under 1% strain compared to a non-exposed reference tested according to ISO 527 and an elongation at break retention of 75% and higher after exposure of an ISO tensile bar for 120 hours to sunscreen (such as Banana Boat®) under 1% strain compared to a non-exposed reference tested according to ISO 527.

A composition can comprise, based on the weight of the composition: 10 to 30 wt. % of a polyetherimide; 30 to 89 wt. % of a poly(carbonate-siloxane); 0.5 to 20 wt. % of a poly(carbonate-arylate ester); and up to 15 wt. % or up to 15 wt. % of an ultraviolet light stabilizer; 0 to 30 wt. % or 0 to 20 wt. % of TiO$_2$; wherein the poly(carbonate-siloxane) comprises bisphenol A carbonate units, and siloxane units of the formula (9b-2), (9b-3), or (9b-4) or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane), wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45, or a poly(bisphenol A carbonate)-co-(bisphenol phthalate ester) comprising 75 to 85 wt. % of the ester units, wherein the ester units have a molar ratio of isophthalate to terephthalate of 98:2 to 88:12, or a combination thereof, and wherein a sample of the composition has a Notched Izod impact of greater than or equal to 500 J/m, measured at +23° C., optionally at +10° C., at −10° C., or at −30° C., according to ASTM D256 and a yield stress retention of 80% and higher after exposure of an ISO tensile bar for 24 hours to sunscreen (such as Banana Boat®) under 1% strain compared to a non-exposed reference tested according to ISO 527 and an elongation at break retention of 75% and higher after exposure of an ISO tensile bar for 24 hours to sunscreen (such as Banana Boat®) under 1% strain compared to a non-exposed reference tested according to ISO 527.

A composition can comprise, based on the weight of the composition: 30 to 45 wt. % of a polyetherimide; 15 to 69 wt. % of a poly(carbonate-siloxane); 0.5 to 20 wt. % of a poly(carbonate-arylate ester); and up to 15 wt. % or up to 10 wt. % or up to 5 wt. % of an ultraviolet light stabilizer; 0 to 20 wt. % of $TiO_2$, wherein the poly(carbonate-siloxane) comprises bisphenol A carbonate units, and siloxane units of the formula (9b-2), (9b-3), (9b-4) or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane), wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45, or a poly(bisphenol A carbonate)-co-(bisphenol phthalate ester) comprising 75 to 85 wt. % of the ester units, wherein the ester units have a molar ratio of isophthalate to terephthalate of 98:2 to 88:12, or a combination thereof, and wherein a sample of the composition has a Notched Izod impact of greater than or equal to 500 J/m, measured at +23° C., according to ASTM D256 and a yield stress retention of 80% and higher after exposure of an ISO tensile bar for 120 hours to sunscreen (such as Banana Boat®) under 1% strain compared to a non-exposed reference tested according to ISO 527 and an elongation at break retention of 75% and higher after exposure of an ISO tensile bar for 120 hours to sunscreen (such as Banana Boat®) under 1% strain compared to a non-exposed reference tested according to ISO 527.

Alternatively a composition comprises, based on the weight of the composition: 10 to 30 wt. % of a polyetherimide; 30 to 89 wt. % of a poly(carbonate-siloxane); 0.5 to 20 wt. % of a poly(carbonate-arylate ester); and up to 15 wt. % or up to 15 wt. % of an ultraviolet light stabilizer; 0 to 20 wt. % of $TiO_2$, wherein the poly(carbonate-siloxane) comprises bisphenol A carbonate units, and siloxane units of the formula (9b-2), (9b-3), (9b-4), or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane), wherein the poly(carbonate-arylate ester) comprises 1 to 20 mol % of bisphenol A carbonate units, 60 to 99 mol % of isophthalic acid-terephthalic acid-resorcinol ester units, and optionally, 1 to 20 mol % resorcinol carbonate units, isophthalic acid-terephthalic acid-bisphenol A ester units, or a combination thereof, and wherein a sample of the composition has a Notched Izod impact of greater than or equal to 200 J/m or greater than or equal to 250 J/m or greater than or equal to 400 J/m, measured at +23° C. or +10° C., according to ASTM D256, and a yield stress retention of 80% and higher after exposure of an ISO tensile bar for 24 hours to sunscreen (such as Banana Boat®) under 1% strain compared to a non-exposed reference tested according to ISO 527, and an elongation at break retention of 75% and higher after exposure of an ISO tensile bar for 24 hours to sunscreen (such as Banana Boat®) under 1% strain compared to a non-exposed reference tested according to ISO 527.

In another embodiment, a composition comprises, based on the weight of the composition: 30 to 45 wt. % of a polyetherimide; 15 to 69 wt. % of a poly(carbonate-siloxane); 0.5 to 20 wt. % of a poly(carbonate-arylate ester); and up to 15 wt % or up to 15 wt. % of an ultraviolet light stabilizer; 0 to 20 wt. % of $TiO_2$, wherein the poly(carbonate-siloxane) comprises bisphenol A carbonate units, and siloxane units of the formula (9b-2), (9b-3), (9b-4), or a combination comprising at least one of the foregoing, wherein the poly(carbonate-siloxane) comprises 0.5 to 55 wt. % of siloxane units based on the total weight of the poly(carbonate-siloxane), wherein the poly(carbonate-arylate ester) comprises 1 to 20 mol % of bisphenol A carbonate units, 60 to 99 mol % of isophthalic acid-terephthalic acid-resorcinol ester units, and optionally, 1 to 20 mol % resorcinol carbonate units, isophthalic acid-terephthalic acid-bisphenol A ester units, or a combination thereof, and wherein a sample of the composition has a Notched Izod impact of greater than or equal to 300 J/m, measured at +23° C., according to ASTM D256 and a yield stress retention of 80% and higher after exposure of an ISO tensile bar for 120 hours to sunscreen (such as Banana Boat®) under 1% strain compared to a non-exposed reference tested according to ISO 527, and an elongation at break retention of 75% and higher after exposure of an ISO tensile bar for 120 hours to sunscreen (such as Banana Boat®) under 1% strain compared to a non-exposed reference tested according to ISO 527.

As another example, a composition comprises, based on the weight of the composition: 10 to 30 wt. % of a polyetherimide; 30 to 89 wt. % of a poly(carbonate-siloxane); 0.5 to 20 wt. % of a poly(carbonate-arylate ester); and up to 15 wt. % or up to 15 wt. % of an ultraviolet light stabilizer; 0 to 20 wt. % of $TiO_2$, wherein the poly(carbonate-siloxane) comprises bisphenol A carbonate units, and siloxane units of the formula (9b-2), (9b-3), (9b-4), or a combination comprising at least one of the foregoing, wherein the poly(carbonate-siloxane) comprises 0.5 to 55 wt. % of dimethylsiloxane units based on the total weight of the poly(carbonate-siloxane), wherein the poly(carbonate-arylate ester) is a poly(carbonate-monoaryl arylate ester) further comprising siloxane groups, comprising repeating carbonate units of the formula (6) such as bisphenol A carbonate units, arylate ester units of the formula (10b) and siloxane units of the formula (9b-2), (9b-3), (9b-4) or a combination thereof, wherein a sample of the composition has a Notched Izod impact of greater than or equal to 200 J/m or greater than or equal to 250 J/m or greater than or equal to 400 J/m, measured at +23° C. or +10° C., according to ASTM D256, and a yield stress retention of 80% and higher after exposure of an ISO tensile bar for 24 hours to sunscreen (such as Banana Boat®) under 1% strain compared to a non-exposed reference tested according to ISO 527, and an elongation at break retention of 75% and higher after exposure of an ISO tensile bar for 24 hours to sunscreen (such as Banana Boat®) under 1% strain compared to a non-exposed reference tested according to ISO 527.

Alternatively, a composition comprises, based on the weight of the composition: 30 to 45 wt. % of a polyetherimide; 15 to 69 wt. % of a poly(carbonate-siloxane); 0.5 to 20 wt. % of a poly(carbonate-arylate ester); and up to 15 wt. % or up to 10 wt. %, r up to 5 wt. % of an ultraviolet light stabilizer; 0 to 20 wt. % of $TiO_2$, wherein the poly(carbonate-siloxane) comprises bisphenol A carbonate units, and siloxane units of the formula (9b-2), (9b-3), (9b-4) or a combination comprising at least one of the foregoing, wherein the poly(carbonate-siloxane) comprises 0.5 to 55 wt. % of siloxane units based on the total weight of the poly(carbonate-siloxane), wherein the poly(carbonate-arylate ester) is a poly(carbonate-monoaryl arylate ester) further comprising siloxane groups, comprising repeating carbonate units of the formula (6) such as bisphenol A carbonate units, arylate ester units of the formula (10b) and siloxane units of the formula (9b-2), (9b-3), (9b-4) or a combination thereof, wherein a sample of the composition has a Notched Izod impact of greater than or equal to 300 J/m, measured at +23° C., according to ASTM D256, and a yield stress retention of 80% and higher after exposure of an ISO tensile bar for 120 hours to sunscreen (such as Banana Boat®) under 1% strain compared to a non-exposed reference tested according to ISO 527, and an elongation at break retention of 75% and higher after exposure of an ISO tensile bar for 120 hours to sunscreen (such as Banana Boat®) under 1% strain compared to a non-exposed reference tested according to ISO 527.

For any one of the foregoing compositions, one or more of the following can apply: (a) the compositions further comprise an additive selected from a processing aid, a heat stabilizer, an ultraviolet light absorber, a colorant, a flame retardant, an impact modifier, or a combination comprising at least one of the foregoing (b) the compositions comprise, based on the total weight of the composition, from 0.0001 to 30 wt. % of each additive present in the composition; (c) the compositions further comprise a dye or a pigment; (d) the compositions further comprise 0.5 to 30 wt. % or 0.5 to 20 wt. % preferably 0.5 to 15 wt. %, of titanium dioxide, wherein optionally the titanium dioxide is an inorganic-coated titanium dioxide without an organic coating or the titanium dioxide is an organic-coated titanium dioxide with an organic coating such as a polysiloxane coating; (e) the ultraviolet light stabilizer is present in an amount of 0.0001 to 15 wt. % or 0.0001 to 10 wt. %, based on the total weight of the composition; (f) the ultraviolet light stabilizer comprises a benzophenone, triazine, benzoxazinones, benzotriazole, benzoate, formamidine, cinnamate/propenoate, aromatic propanedione, benzimidazole, cycloaliphatic ketone, formanilide, cyanoacrylate, benzopyranone, salicylate, or a combination comprising at least one of the foregoing; (g) the ultraviolet light stabilizer comprises resorcinol monobenzoate; 2-(2H-benzotriazol-2-yl)-4-(1,1,3,3-tetramethylbutyl)-phenol; 2-hydroxy-4-n-octyloxybenzophenone; 2-[4,6-bis (2,4-dimethylphenyl)-1,3,5-triazin-2-yl]-5-(octyloxy)-phenol; 2,2'-(1,4-phenylene)bis(4H-3,1-benzoxazin-4-one); poly[(6-morphilino-s-triazine-2,4-diyl)[2,2,6,6-tetramethyl-4-piperidyl) imino]-hexamethylene[(2,2,6,6-tetramethyl-4-piperidyl)imino], 2-hydroxy-4-octyloxybenzophenone, 6-tert-butyl-2-(5-chloro-2H-benzotriazole-2-yl)-4-methylphenyl, 2,4-di-tert-butyl-6-(5-chloro-2H-benzotriazole-2-yl)-phenol, 2-(2H-benzotriazole-2-yl)-4,6-di-tert-pentylphenol, 2-(2H-benzotriazole-2-yl)-4-(1,1,3,3-tetramethylbutyl)-phenol, 1,3-bis[(2' cyano-3',3'-diphenylacryloyl)oxy]-2,2-bis-{[(2'-cyano-3',3'-diphenylacryloyl)oxy]methyl}-propane, 2-(2H-benzotriazole-2-yl)-4-methylphenol, 2-(2H-benzotriazole-2-yl)-4,6-bis(1-methyl-1-phenyethyl)phenol, ethyl-2-cyano-3,3-diphenylacrylate, (2-ethylhexyl)-2-cyano-3,3-diphenylacrylate, N,N'-bisformyl-N,N'-bis(2,2,6, 6-tetramethyl-4-piperidinyl)hexamethylendiamine, bis-(2,2, 6,6-tetramethyl-4-piperidyl)-sebacate, bis-(1,2,2,6,6-pentamethyl-4-piperdiyl)-sebacate+methyl-(1,2,2,6,6-pentamethyl-4-piperidyl)-sebacate, 1,3-bis[(2-cyano-3,3-diphenylacryloyl)oxy]-2,2-bis[[(2-cyano-3,3-diphenylacryloyl)oxy]methyl]propane; 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl) oxy]methyl]propane, or a combination comprising at least one of the foregoing; (g) the ultraviolet light stabilizer comprises 2,2"-methylenebis(6-(2H-benzotriazol-2-yl)-4-4 (1,1,3,3,-tetramethylbutyl)phenol; 2,2'-(p-phenylene) bis-4H-3,1-benzoxazin-4-one; or a combination comprising at least one of the foregoing; (r) the ultraviolet light stabilizer comprises 2-(2'hydroxy-5-t-octylphenyl)-benzotriazole; 2,2'-methylenebis[6-(2H-benzotriazol-2-yl)-4-(1,1,3,3-tetramethylbutyl)phenol]; 2-(2-hydroxy-3,5-di-cumyl)benzotriazole; 2-(4,6-diphenyl-1,3,5-triazin-2-yl)-5-hexyloxyphenol; 2,2'-(1,4-phenylene)bis-4H-3,1-benzoxazine-4-one; or a combination comprising at least one of the foregoing; or (h) the compositions further comprise an aromatic organophosphorus compound having at least one organic aromatic group and at least one phosphorus-containing group, or an organic compound having at least one phosphorus-nitrogen bond wherein optionally the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing; and wherein organophosphorus compound containing a nitrogen-phosphorus bond is a phosphazene, phosphorus ester amide, phosphoric acid amide, phosphonic acid amide, phosphinic acid amide, tris(aziridinyl) phosphine oxide, a combination comprising at least one of the foregoing; (i) the compositions further comprise a reinforcing agent, wherein optionally the reinforcing agent comprises glass fibers, preferably in an amount from 1 to 200 parts by weight based on 100 parts by weight of the polymers, wherein the glass fibers have a round or flat cross-section.

The compositions of any one of the foregoing embodiment can additionally have one or more of the following properties: (a) the compositions have an at least 50% higher notched Izod impact energy value compared to the compositions without the compatibilizer component measured in accordance to ASTM D256 or ISO 180/1A; (b) the compositions have at least 5%, 10%, 20%, or 30% higher gloss than the same compositions without the compatibilizer; (c) the compositions have a lower delta E than the same compositions without the compatibilizer after ultraviolet aging; or (d) the compositions have a delta E after aging of less than 20, less than 10, less than 8, less than 5, or less than 3 after 300 hours of exposure to UV radiation measured according to ASTM D4459.

In another embodiment an article selected from a molded article, a thermoformed article, an extruded sheet, an extruded fiber or filament, a foamed article, a printed article, one or more layers of a multi-layer article, a substrate for a coated article, and a substrate for a metallized article comprising the compositions of any one of foregoing embodiments.

One or more of the following conditions can apply to the article: (a) the article further comprises a metal deposited on a surface of the article, wherein optionally the metal comprises aluminum and optionally the metal is anodized; (b) the composition maintains its properties during an anodization process; (c) no property of the composition varies by more than 10%, preferably by no more than 5%, and more preferably by no more than 2% after anodization relative to the same property before anodization; (d) the article is a component of a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar wherein optionally the component is a housing, a frame, a clip, a bezel, a bushing, a flange, a strut, a prong, a fin, or a rib; (e) the article is a component of an automotive selected from panels, quarter panels, rocker panels, trim fenders, deck lids, trunk fairings and lids, hoods, bumpers, fascia, grilles, minor housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, or running boards.

A method of manufacture of an article, comprising molding, extruding, 3-dimensional printing, or casting the composition of any one of foregoing embodiments to form the article.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Unless otherwise indicated, exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; amino($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising, based on the total weight of the thermoplastic composition,
   10 to 45 wt. % of a poly(etherimide);
   35 to 90 wt. % of a poly(carbonate-siloxane);
   0.5 to 20 wt. % of compatibilizer polycarbonate component comprising a poly(carbonate-arylate ester);
   up to 15 wt. % of an ultraviolet light stabilizer; and
   0 to 30 wt. % of $TiO_2$;
   wherein a sample of the composition has
   a notched Izod impact energy of at least 200 J/m at 23° C. measured in accordance to ASTM D256; and
   an at least 50% higher notched Izod impact energy value compared to the composition without the compatibilizer component measured in accordance to ASTM D256.

2. The composition of claim 1, wherein the poly(etherimide) comprises units of the formula

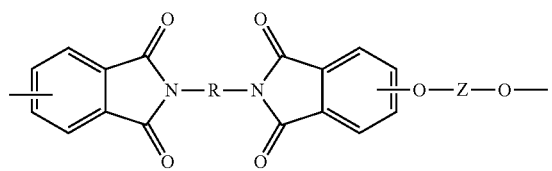

wherein
R is a $C_{2-20}$ hydrocarbon group, and
Z is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions.

3. The composition of claim 2, wherein R is a divalent radical of the formula

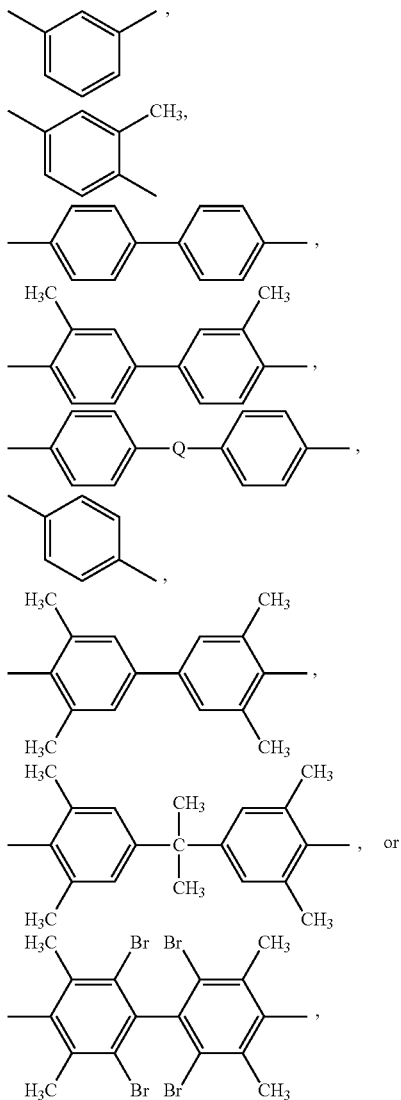

wherein Q is —O—, —S—, —C(O)—, —SO$_2$—, —SO—, or —C$_y$H$_{2y}$— and a halogenated derivative thereof
wherein y is an integer from 1 to 5, and
Z is a divalent group of the formula

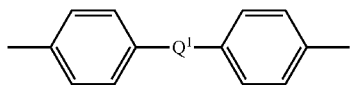

wherein $Q^1$ is —O—, —S—, —C(O)—, —SO$_2$—, —SO—, or —C$_y$H$_{2y}$— wherein y is an integer from 1 to 5.

4. The composition of claim 1, further comprising 0.5 to 10 wt. % of a poly(etherimide-siloxane) copolymer.

5. The composition of claim 1, wherein the poly(carbonate-siloxane) comprises first repeating units and second repeating units, wherein
the first repeating units are bisphenol carbonate units of the formula

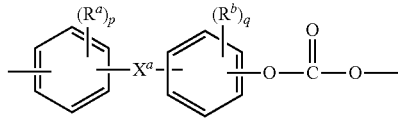

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula —C($R^c$)($R^d$) wherein $R^c$ and $R^d$ are each independently hydrogen or $C_{1-10}$ alkyl, or a group of the formula C(=$R^e$)— wherein $R^e$ is a divalent $C_{1-10}$ hydrocarbon group; and
the second repeating units are polysiloxane units of the formula

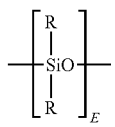

wherein
R is each independently a $C_{1-13}$ monovalent hydrocarbon group, and
E has an average value of 2 to 200.

6. The composition of claim 5, wherein the siloxane units are of the formula

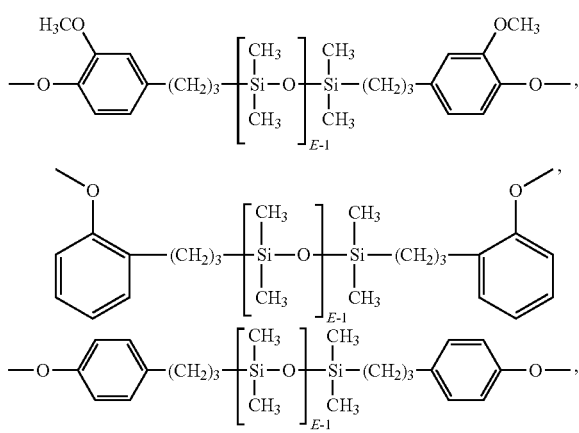

or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane).

7. The composition of claim 1, wherein the poly(carbonate-arylate ester) comprises bisphenol A carbonate units and arylate ester units of the formula

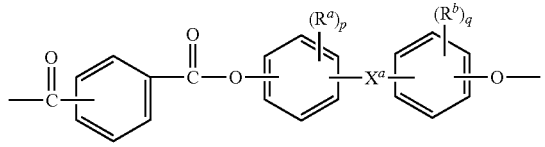

wherein
R$^a$ and R$^b$ are each independently C$_{1-12}$ alkyl, C$_{1-12}$ alkenyl, C$_{3-8}$ cycloalkyl, or C$_{1-12}$ alkoxy,
p and q are each independently 0 to 4, and
X$^a$ is a single bond, —O—, —S—, —S(O)—, —S(O)$_2$—, —C(O)—, a C$_{1-11}$ alkylidene of the formula C(R$^c$)(R$^d$)— wherein R$^c$ and R$^d$ are each independently hydrogen or C$_{1-10}$ alkyl, or a group of the formula —C(=R$^e$)— wherein R$^e$ is a divalent C$_{1-10}$ hydrocarbon group.

8. The composition of claim 7, wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45 or the poly(carbonate-arylate ester) is a poly(bisphenol A carbonate)-co-(bisphenol phthalate ester) comprising 75 to 85 wt. % of the ester units, wherein the ester units have a molar ratio of isophthalate to terephthalate of 98:2 to 88:12.

9. The composition of claim 1, wherein the poly(carbonate-arylate ester) comprises bisphenol A carbonate units, arylate ester units of the formula

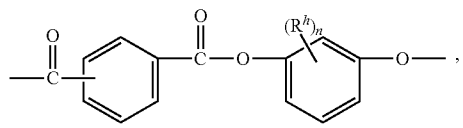

optionally, monoaryl carbonate units of the formula

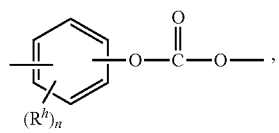

and
optionally, bisphenol ester units of the formula

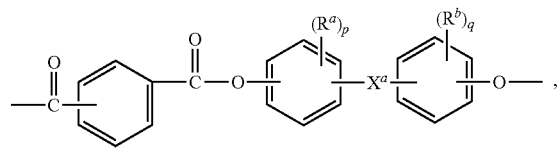

wherein, in the foregoing formulas
R$^h$ is each independently a C$_{1-10}$ hydrocarbon group,
n is 0 to 4,
R$^a$ and R$^b$ are each independently a C$_{1-12}$ alkyl,
p and q are each independently integers of 0 to 4, and X$^a$ is a single bond, —O—, —S—, —S(O)—, —S(O)$_2$—, —C(O)—, or a C$_{1-13}$ alkylidene of formula —C(R$^c$)(R$^d$)— wherein R$^c$ and R$^d$ are each independently hydrogen or C$_{1-12}$ alkyl, or a group of the formula —C(=R$^e$)— wherein R$^e$ is a divalent C$_{1-12}$ hydrocarbon group.

10. The composition of claim 9, wherein the poly(carbonate-arylate ester) comprises
70 to 90 mol % of bisphenol A carbonate units,
10 to 30 mol % of isophthalic acid-terephthalic acid-resorcinol ester units, and
optionally, 1 to 60 mol % resorcinol carbonate units, isophthalic acid-terephthalic acid-bisphenol A ester units, or a combination thereof.

11. The composition of claim 9, wherein the poly(carbonate-arylate ester) comprises
1 to 20 mol % of bisphenol A carbonate units,
60 to 99 mol % of isophthalic acid-terephthalic acid-resorcinol ester units, and
optionally, 1 to 20 mol % resorcinol carbonate units, isophthalic acid-terephthalic acid-bisphenol A ester units, or a combination thereof.

12. The composition of claim 1, wherein the poly(carbonate-arylate ester) is a poly(carbonate-monoaryl arylate ester) further comprising siloxane groups comprising
repeating carbonate units of the formula

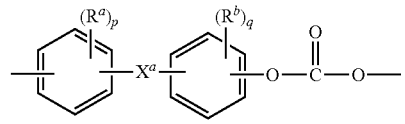

wherein
R$^a$ and R$^b$ are each independently are each independently C$_{1-12}$ alkyl,
p and q are each independently integers of 0 to 4, and
X$^a$ is a single bond, —O—, —S—, —S(O)—, —S(O)$_2$—, —C(O)—, or a C$_{1-18}$ organic group; and
arylate ester units of the formula

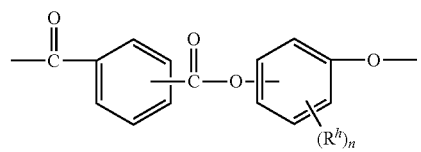

wherein
R$^h$ is each independently a halogen or C$_{1-10}$ hydrocarbon group, and
n is 0 to 4; and
siloxane units of the formula

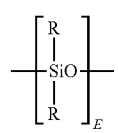

wherein
each R is independently a C$_{1-13}$ monovalent hydrocarbon group, and
E has an average value of 2 to 500.

13. The composition of claim 12, wherein in the poly(carbonate-monoaryl arylate ester),
the carbonate units are bisphenol A carbonate units;
the arylate ester units are isophthalic acid-terephthalic acid-resorcinol units; and
the siloxane units are of the formula

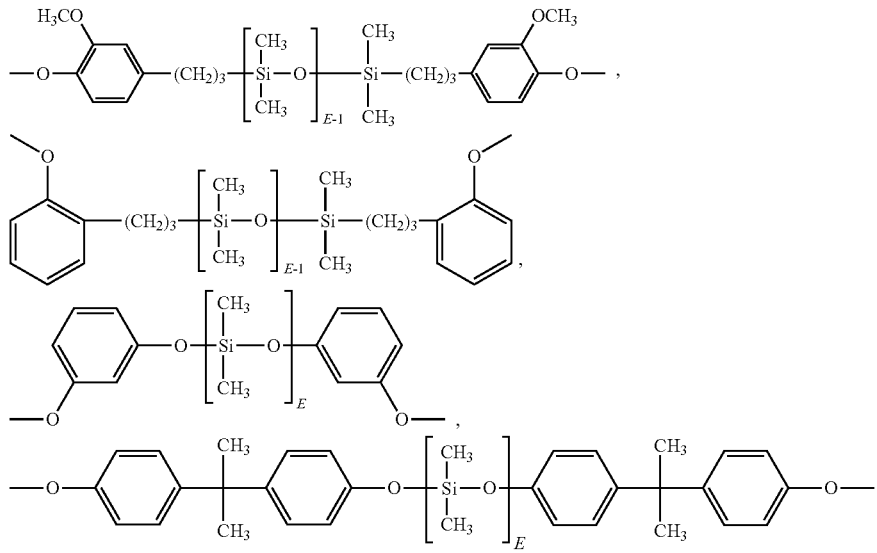

or a combination comprising at least one of the foregoing, wherein E has an average value of 5 to 30.

14. The composition of claim 1, further comprising an additive selected from a processing aid, a heat stabilizer, an ultraviolet light absorber, a colorant, a flame retardant, an impact modifier, or a combination comprising at least one of the foregoing.

15. The composition of claim 1, wherein the composition comprises 0.5 to 30 wt. % of titanium dioxide.

16. The composition of claim 1, wherein the composition further comprises a ultraviolet light stabilizer in an amount of 0.0001 to 15 wt. %, based on the total weight of the composition.

17. The composition of claim 16, wherein the ultraviolet light stabilizer comprises a benzophenone, triazine, benzoxazinones, benzotriazole, benzoate, formamidine, cinnamate/propenoate, aromatic propanedione, benzimidazole, cycloaliphatic ketone, formanilide, cyanoacrylate, benzopyranone, salicylate, or a combination comprising at least one of the foregoing.

18. The composition of claim 16, wherein the ultraviolet light stabilizer comprises 2,2"-methylenebis(6-(2H-benzotriazol-2-yl)-4-4(1,1,3,3,-tetramethylbutyl)phenol; 2,2'-(p-phenylene) bis-4H-3,1-benzoxazin-4-one, 2-(2'hydroxy-5-t-octylphenyl)-benzotriazole; 2,2'-methylenebis[6-(2H-benzotriazol-2-yl)-4-(1,1,3,3-tetramethylbutyl)phenol]; 2,2'-methylenebis[6-(2H-benzotriazol-2-yl)-4-(1,1,3,3-tetramethylbutyl)phenol]; 2-(2-hydroxy-3,5-di-cumyl)benzotriazole; 2-(4,6-diphenyl-1,3,5-triazin-2-yl)-5-hexyloxyphenol; 2,2'-(1,4-phenylene)bis-4H-3,1-benzoxazine-4-one, resorcinol monobenzoate; 2-(2H-benzotriazol-2-yl)-4-(1,1,3,3-tetramethylbutyl)-phenol; 2-hydroxy-4-n-octyloxybenzophenone; 2-[4,6-bis(2,4-dimethylphenyl)-1,3,5-triazin-2-yl]-5-(octyloxy)-phenol; 2,2'-(1,4-phenylene)bis(4H-3,1-benzoxazin-4-one); poly[(6-morphilino-s-triazine-2,4-diyl)[2,2,6,6-tetramethyl-4-piperidyl) imino]-hexamethylene[(2,2,6,6-tetramethyl-4-piperidyl)imino], 2-hydroxy-4-octyloxybenzophenone, 6-tert-butyl-2-(5-chloro-2H-benzotriazole-2-yl)-4-methylphenyl, 2,4-di-tert-butyl-6-(5-chloro-2H-benzotriazole-2-yl)-phenol, 2-(2H-benzotriazole-2-yl)-4,6-di-tert-pentylphenol, 2-(2H-benzotriazole-2-yl)-4-(1,1,3,3-tetramethylbutyl)-phenol, 1,3-bis[(2'cyano-3',3'-diphenylacryloyl)oxy]-2,2-bis-{[(2'-cyano-3',3'-diphenylacryloyl)oxy]methyl}-propane, 2-(2H-benzotriazole-2-yl)-4-methylphenol, 2-(2H-benzotriazole-2-yl)-4,6-bis(1-methyl-1-phenyethyl)phenol, ethyl-2-cyano-3,3-diphenylacrylate, (2-ethylhexyl)-2-cyano-3,3-diphenylacrylate, N,N'-bisformyl-N,N'-bis(2,2,6,6-tetramethyl-4-piperidinyl)hexamethylendiamine, bis-(2,2,6,6-tetramethyl-4-piperidyl)-sebacate, bis-(1,2,2,6,6-pentamethyl-4-piperdiyl)-sebacate+methyl-(1,2,2,6,6-pentamethyl-4-piperidyl)-sebacate, 1,3-bis[(2-cyano-3,3-diphenylacryloyl)oxy]-2,2-bis[[(2-cyano-3,3-diphenylacryloyl)oxy]methyl]propane; 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane, or a combination comprising at least one of the foregoing.

19. The composition of claim 1, having
a yield stress retention of 80% and higher after exposure of an ISO tensile bar for 24 hours to sunscreen under 0.5% or 1% strain compared to a non-exposed reference tested according to ISO 527 and
an elongation at break retention of 75% and higher after exposure of an ISO tensile bar for 24 hours to sunscreen under 0.5% or 1% strain compared to a non-exposed reference tested according to ISO 527.

20. The composition of claim 19, having an at least 50% higher notched Izod impact energy value compared to the composition without the compatibilizer component measured in accordance to ASTM D256 or ISO 180/1A.

21. The composition of claim 1, having a lower delta E than the same composition without the compatibilizer after ultraviolet aging.

22. The composition of claim 1, further comprising a reinforcing agent, wherein optionally the reinforcing agent comprises glass fibers, in an amount from 1 to 200 parts by weight based on 100 parts by weight of the polymers, wherein the glass fibers have a round or flat cross-section.

23. An article selected from a molded article, a thermoformed article, an extruded sheet, an extruded fiber or filament, a foamed article, one or more layers of a multi-layer article, a substrate for a coated article, a printed article, and a substrate for a metallized article comprising the composition of claim 1.

24. The article of claim 23 further comprising a metal deposited on a surface of the article.

25. The article of claim 23, wherein the metal is anodized.

26. The article of claim 23, wherein the article is a component of a consumer electronic device selected from a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, and active loudspeaker, or a soundbar.

27. The article of claim 23, wherein the article is an automotive component selected from panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, or running boards.

28. A method of manufacture of an article, comprising molding, extruding, 3-dimensional printing, or casting the composition of claim 1 to form the article.

29. The composition of claim 1, wherein the composition comprises 0.5 to 15 wt. % of titanium dioxide.

30. The composition of claim 1, wherein the composition comprises 5 to 15 wt. % of titanium dioxide.

31. A thermoplastic composition comprising, based on the weight of the composition:
    20 to 35 wt. % of a poly(etherimide);
    50 to 75 wt. % of a poly(carbonate-siloxane); and
    5 to 35 wt. % of compatibilizer polycarbonate component comprising a poly(carbonate-arylate ester); and
    0 to 15 wt. % of an ultraviolet light stabilizer; and
    0 to 30 wt. % of titanium dioxide; and
    wherein a sample of the composition has a notched Izod impact energy value greater than 300 J/m at room temperature compared to the composition without the compatibilizer component measured in accordance to ASTM D256; and
    wherein a sample of the composition has a poly(etherimide) domain size in at least one dimension equal to or lower than 1 micron as measured by STEM.

* * * * *